(12) United States Patent
Ghafourifar et al.

(10) Patent No.: US 11,366,838 B1
(45) Date of Patent: *Jun. 21, 2022

(54) SYSTEM AND METHOD OF CONTEXT-BASED PREDICTIVE CONTENT TAGGING FOR ENCRYPTED DATA

(71) Applicant: Entefy Inc., Palo Alto, CA (US)

(72) Inventors: Alston Ghafourifar, Los Altos Hills, CA (US); Mehdi Ghafourifar, Los Altos Hills, CA (US); Brienne Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/836,691

(22) Filed: Mar. 31, 2020

Related U.S. Application Data

(63) Continuation of application No. 16/220,943, filed on Dec. 14, 2018, now Pat. No. 10,606,871, which is a
(Continued)

(51) Int. Cl.
*G06F 16/31* (2019.01)
*G06F 21/62* (2013.01)
(Continued)

(52) U.S. Cl.
CPC .......... *G06F 16/313* (2019.01); *G06F 16/148* (2019.01); *G06F 16/2228* (2019.01);
(Continued)

(58) Field of Classification Search
CPC ....................................................... H04L 51/16
See application file for complete search history.

(56) References Cited

U.S. PATENT DOCUMENTS 5,481,597 A 1/1996 Given
5,951,638 A 9/1999 Hoss
(Continued)

FOREIGN PATENT DOCUMENTS

WO 9931575 6/1999
WO 2013112570 A1 8/2013

OTHER PUBLICATIONS

Guangyi Xiao et al., "User Interoperability With Heterogeneous IoT Devices Through Transformation," pp. 1486-1496, 2014.
(Continued)

*Primary Examiner* — Nicholas R Taylor
*Assistant Examiner* — Sm Z Islam
(74) *Attorney, Agent, or Firm* — Haynes and Boone, LLP

(57) ABSTRACT

This disclosure relates to systems, methods, and computer readable media for performing multi-format, multi-protocol message threading in a way that is most beneficial for the individual user. Users desire a system that will provide for ease of message threading by "stitching" together related communications in a manner that is seamless from the user's perspective. Such stitching together of communications across multiple formats and protocols may occur, e.g., by: 1) direct user action in a centralized communications application (e.g., by a user clicking 'Reply' on a particular message); 2) using semantic matching (or other search-style message association techniques); 3) element-matching (e.g., matching on subject lines or senders/recipients/similar quoted text, etc.); and 4) "state-matching" (e.g., associating messages if they are specifically tagged as being related to another message, sender, etc. by a third-party service, e.g., a webmail provider or Instant Messaging (IM) service).

23 Claims, 16 Drawing Sheets

Related U.S. Application Data continuation of application No. 14/187,699, filed on Feb. 24, 2014, now Pat. No. 10,169,447.

(51) Int. Cl.

| | | |
|---|---|---|
| *G06F 16/22* | (2019.01) | |
| *H04L 51/56* | (2022.01) | |
| *G06F 16/14* | (2019.01) | |
| *G06F 16/33* | (2019.01) | |
| *H04L 51/00* | (2022.01) | |
| *H04L 51/066* | (2022.01) | |
| *G06F 16/951* | (2019.01) | |

(52) U.S. Cl.
CPC .......... *G06F 16/334* (2019.01); *G06F 16/951* (2019.01); *G06F 21/6227* (2013.01); *H04L 51/066* (2013.01); *H04L 51/16* (2013.01); *H04L 51/36* (2013.01)

(56) References Cited

U.S. PATENT DOCUMENTS

| | | | |
|---|---|---|---|
| 6,101,320 A | 8/2000 | Schuetze | |
| 6,950,502 B1 | 9/2005 | Jenkins | |
| 7,317,929 B1 | 1/2008 | El-Fishawy | |
| 7,450,937 B1 | 11/2008 | Claudatos | |
| 7,673,327 B1 | 3/2010 | Polis | |
| 7,680,752 B1 | 3/2010 | Clune, III | |
| 7,734,705 B1 | 6/2010 | Wheeler, Jr. | |
| 7,886,000 B1 | 2/2011 | Polis | |
| 7,908,647 B1 | 3/2011 | Polis | |
| 8,090,787 B2 | 1/2012 | Polis | |
| 8,095,592 B2 | 1/2012 | Polis | |
| 8,108,460 B2 | 1/2012 | Polis | |
| 8,112,476 B2 | 2/2012 | Polis | |
| 8,122,080 B2 | 2/2012 | Polis | |
| 8,156,183 B2 | 4/2012 | Polis | |
| 8,281,125 B1 | 10/2012 | Briceno | |
| 8,296,360 B2 | 10/2012 | Polis | |
| 8,433,705 B1* | 4/2013 | Dredze | G06F 16/24578 707/723 |
| 8,438,223 B2 | 5/2013 | Polis | |
| 8,458,256 B2 | 6/2013 | Polis | |
| 8,458,292 B2 | 6/2013 | Polis | |
| 8,458,347 B2 | 6/2013 | Polis | |
| 8,468,202 B2 | 6/2013 | Polis | |
| 8,468,445 B2 | 6/2013 | Gupta | |
| 8,521,526 B1 | 8/2013 | Lloyd | |
| 8,527,525 B2 | 9/2013 | Fong | |
| 8,959,156 B2 | 2/2015 | Polis | |
| 9,088,533 B1 | 7/2015 | Zeng | |
| 9,529,522 B1 | 12/2016 | Barros | |
| 9,875,740 B1 | 1/2018 | Kumar | |
| 2002/0133509 A1 | 9/2002 | Johnston | |
| 2002/0152091 A1 | 10/2002 | Nagaoka | |
| 2002/0160757 A1 | 10/2002 | Shavit | |
| 2002/0178000 A1 | 11/2002 | Aktas | |
| 2002/0194322 A1 | 12/2002 | Nagata | |
| 2003/0096599 A1 | 5/2003 | Takatsuki | |
| 2004/0117507 A1 | 6/2004 | Torma | |
| 2004/0137884 A1 | 7/2004 | Engstrom | |
| 2004/0177048 A1 | 9/2004 | Klug | |
| 2004/0243719 A1 | 12/2004 | Roselinsky | |
| 2004/0266411 A1 | 12/2004 | Galicia | |
| 2005/0015443 A1 | 1/2005 | Levine | |
| 2005/0080857 A1 | 4/2005 | Kirsch | |
| 2005/0101337 A1 | 5/2005 | Wilson | |
| 2005/0198159 A1 | 9/2005 | Kirsch | |
| 2006/0193450 A1 | 8/2006 | Flynt | |
| 2006/0212757 A1 | 9/2006 | Ross | |
| 2007/0054676 A1 | 3/2007 | Duan | |
| 2007/0073816 A1 | 3/2007 | Kumar | |
| 2007/0100680 A1 | 5/2007 | Kumar | |
| 2007/0116195 A1 | 5/2007 | Thompson | |
| 2007/0130273 A1 | 6/2007 | Huynh | |
| 2007/0180130 A1 | 8/2007 | Arnold | |
| 2007/0237135 A1 | 10/2007 | Trevallyn-Jones | |
| 2007/0299796 A1 | 12/2007 | MacBeth | |
| 2008/0062133 A1 | 3/2008 | Wolf | |
| 2008/0088428 A1 | 4/2008 | Pitre | |
| 2008/0112546 A1 | 5/2008 | Fletcher | |
| 2008/0236103 A1 | 10/2008 | Lowder | |
| 2008/0261569 A1 | 10/2008 | Britt | |
| 2008/0263103 A1 | 10/2008 | McGregor | |
| 2009/0016504 A1 | 1/2009 | Mantell | |
| 2009/0119370 A1 | 5/2009 | Stern | |
| 2009/0177477 A1 | 7/2009 | Nenov | |
| 2009/0177484 A1 | 7/2009 | Davis | |
| 2009/0177744 A1 | 7/2009 | Marlow | |
| 2009/0181702 A1* | 7/2009 | Vargas | H04L 51/14 455/466 |
| 2009/0187846 A1 | 7/2009 | Paasovaara | |
| 2009/0271486 A1 | 10/2009 | Ligh | |
| 2009/0292814 A1 | 11/2009 | Ting | |
| 2009/0299996 A1 | 12/2009 | Yu | |
| 2010/0057872 A1 | 3/2010 | Koons | |
| 2010/0198880 A1 | 8/2010 | Petersen | |
| 2010/0210291 A1 | 8/2010 | Lauer | |
| 2010/0220585 A1 | 9/2010 | Poulson | |
| 2010/0223341 A1 | 9/2010 | Manolescu | |
| 2010/0229107 A1* | 9/2010 | Turner | H04L 67/2823 715/757 |
| 2010/0250578 A1 | 9/2010 | Athsani | |
| 2010/0312644 A1 | 12/2010 | Borgs | |
| 2010/0323728 A1 | 12/2010 | Gould | |
| 2010/0325227 A1 | 12/2010 | Novy | |
| 2011/0010182 A1 | 1/2011 | Turski | |
| 2011/0051913 A1 | 3/2011 | Kesler | |
| 2011/0078247 A1 | 3/2011 | Jackson | |
| 2011/0078256 A1 | 3/2011 | Wang | |
| 2011/0078267 A1 | 3/2011 | Lee | |
| 2011/0130168 A1 | 6/2011 | Vendrow | |
| 2011/0194629 A1* | 8/2011 | Bekanich | H04W 4/02 375/259 |
| 2011/0219008 A1 | 9/2011 | Been | |
| 2011/0265010 A1 | 10/2011 | Ferguson | |
| 2011/0276640 A1 | 11/2011 | Jesse | |
| 2011/0279458 A1 | 11/2011 | Gnanasambandam | |
| 2011/0295851 A1 | 12/2011 | El-Saban | |
| 2012/0016858 A1 | 1/2012 | Rathod | |
| 2012/0209847 A1 | 8/2012 | Rangan | |
| 2012/0210253 A1 | 8/2012 | Luna | |
| 2012/0221962 A1 | 8/2012 | Lew | |
| 2013/0018945 A1 | 1/2013 | Vendrow | |
| 2013/0024521 A1* | 1/2013 | Pocklington | H04L 51/16 709/206 |
| 2013/0067345 A1 | 3/2013 | Das | |
| 2013/0097279 A1 | 4/2013 | Polis | |
| 2013/0111487 A1 | 5/2013 | Cheyer | |
| 2013/0127864 A1 | 5/2013 | Nevin, III | |
| 2013/0151508 A1 | 6/2013 | Kurabayashi | |
| 2013/0197915 A1 | 8/2013 | Burke | |
| 2013/0262385 A1 | 10/2013 | Kumarasamy | |
| 2013/0262852 A1 | 10/2013 | Roeder | |
| 2013/0267264 A1 | 10/2013 | Abuelsaad | |
| 2013/0268516 A1 | 10/2013 | Chaudhri | |
| 2013/0304830 A1 | 11/2013 | Olsen | |
| 2013/0325343 A1 | 12/2013 | Blumenberg | |
| 2013/0332308 A1* | 12/2013 | Linden | G06Q 30/0631 705/26.7 |
| 2014/0006525 A1* | 1/2014 | Freund | H04L 51/16 709/206 |
| 2014/0020047 A1 | 1/2014 | Liebmann | |
| 2014/0032538 A1 | 1/2014 | Arngren | |
| 2014/0149399 A1 | 5/2014 | Kurzion | |
| 2014/0270131 A1 | 9/2014 | Hand | |
| 2014/0280460 A1 | 9/2014 | Nemer | |
| 2014/0297807 A1* | 10/2014 | Dasgupta | H04L 65/4053 709/219 |
| 2014/0355907 A1 | 12/2014 | Pesavento | |
| 2015/0019406 A1 | 1/2015 | Lawrence | |
| 2015/0039887 A1 | 2/2015 | Kahol | |
| 2015/0095127 A1 | 4/2015 | Patel | |
| 2015/0149484 A1 | 5/2015 | Kelley | |

(56) References Cited

U.S. PATENT DOCUMENTS

| | | |
|---|---|---|
| 2015/0186455 A1 | 7/2015 | Horling |
| 2015/0261496 A1 | 9/2015 | Faaborg |
| 2015/0278370 A1 | 10/2015 | Stratvert |
| 2015/0281184 A1 | 10/2015 | Cooley |
| 2015/0286747 A1 | 10/2015 | Anastasakos |
| 2015/0286943 A1 | 10/2015 | Wang |
| 2015/0339405 A1 | 11/2015 | Vora |
| 2016/0048548 A1 | 2/2016 | Thomas |
| 2016/0078030 A1 | 3/2016 | Brackett |
| 2016/0087944 A1 | 3/2016 | Downey |
| 2016/0092959 A1 | 3/2016 | Gross |
| 2016/0173578 A1 | 6/2016 | Sharma |
| 2017/0039246 A1 | 2/2017 | Bastide |
| 2017/0039296 A1 | 2/2017 | Bastide |
| 2017/0116578 A1 | 4/2017 | Hadatsuki |
| 2017/0206276 A1 | 7/2017 | Gill |
| 2017/0364587 A1 | 12/2017 | Krishnamurthy |
| 2018/0048661 A1 | 2/2018 | Bird |
| 2018/0101506 A1 | 4/2018 | Hodaei |
| 2018/0121603 A1 | 5/2018 | Devarakonda |

OTHER PUBLICATIONS

Marr, Bernard, Key Business Analytics, Feb. 2016, FT Publishing International, Ch. 17 "Neural Network Analysis" (Year: 2016).

\* cited by examiner

SYSTEM AND METHOD OF CONTEXT-BASED PREDICTIVE CONTENT TAGGING FOR ENCRYPTED DATA

CROSS-REFERENCE TO RELATED APPLICATION

This application claims priority to, and is a continuation of, U.S. patent application Ser. No. 16/220,943, filed Dec. 14, 2018, issued as U.S. Pat. No. 10,606,871, which is a continuation of U.S. patent application Ser. No. 14/187,699, filed Feb. 24, 2014, issued as U.S. Pat. No. 10,169,447, both of which are hereby incorporated by reference in their entirety.

TECHNICAL FIELD

This disclosure relates generally to systems, methods, and computer readable media for message threading across multiple communications formats and protocols.

BACKGROUND

The proliferation of personal computing devices in recent years, especially mobile personal computing devices, combined with a growth in the number of widely-used communications formats (e.g., text, voice, video, image) and protocols (e.g., SMTP, IMAP/POP, SMS/MMS, XMPP, YMSG, etc.) has led to a communications experience that many users find fragmented and difficult to search for relevant information in. Users desire a system that will provide for ease of message threading by "stitching" together related communications across multiple formats and protocols—all seamlessly from the user's perspective. Such stitching together of communications across multiple formats and protocols may occur, e.g., by: 1) direct user action in a centralized communications application (e.g., by a user clicking 'Reply' on a particular message); 2) using semantic matching (or other search-style message association techniques); 3) element-matching (e.g., matching on subject lines or senders/recipients/similar quoted text, etc.); and 4) "state-matching" (e.g., associating messages if they are specifically tagged as being related to another message, sender, etc. by a third-party service, e.g., a webmail provider or Instant Messaging (IM) service.

With current communications technologies, conversations remain "siloed" within particular communication formats or protocols, leading to users being unable to search across multiple communications in multiple formats or protocols and across multiple applications on their computing devices to find relevant communications (or even communications that a messaging system may predict to be relevant), often resulting in inefficient communication workflows—and even lost business or personal opportunities. For example, a conversation between two people may begin over text messages (e.g., SMS) and then transition to email. When such a transition happens, the entire conversation can no longer be tracked, reviewed, searched, or archived by a single source since it had 'crossed over' protocols. For example, if the user ran a search on their email search system for a particular topic that had come up only in the user's SMS conversations, such a search may not turn up optimally relevant results.

Further, a multi-format, multi-protocol, communication threading system, such as is disclosed herein, may also provide for the semantic analysis of conversations. For example, for a given set of communications between two users, there may be only a dozen or so keywords that are relevant and related to the subject matter of the communications. These dozen or so keywords may be used to generate an "initial tag cloud" to associate with the communication(s) being indexed. The initial tag cloud can be created based on multiple factors, such as the uniqueness of the word, the number of times a word is repeated, phrase detection, etc. These initial tag clouds may then themselves be used to generate further an expanded "predictive tag cloud," based on the use of Markov chains or other predictive analytics based on established language theory techniques and data derived from existing communications data in a centralized communications server. These initial tag clouds and predictive tag clouds may be used to improve message indexing and provide enhanced relevancy in search results. In doing so, the centralized communications server may establish connections between individual messages that were sent/received using one or multiple communication formats or protocols and that may contain information relevant to the user's initial search query.

The subject matter of the present disclosure is directed to overcoming, or at least reducing the effects of, one or more of the problems set forth above. To address these and other issues, techniques that enable seamless, multi-format, multi-protocol communication threading are described herein.

DETAILED DESCRIPTION

Disclosed are systems, methods, and computer readable media for threading communications for computing devices across multiple formats and multiple protocols. More particularly, but not by way of limitation, this disclosure relates to systems, methods, and computer readable media to permit computing devices, e.g., smartphones, tablets, laptops, wearables, and the like, to present users with a seamless, multi-format, multi-protocol, communication threading system that may also perform semantic and predictive analysis based on the content of the multi-format, multi-protocol communications that are stored by a centralized communications server.

Use of a multi-format, multi-protocol, communication threading system allows users to view/preview all their messages, conversations, documents, etc., which are related (or potentially related) to a particular query in a single unified results feed. Such a multi-format, multi-protocol, communication threading system may also provide the ability to "stitch" together communications across one or more of a variety of communication protocols, including SMTP, IMAP/POP, SMS/MMS, XMPP, PMSG, and/or social media protocols. Further, the use of semantic and predictive analysis on the content of a user's communications may help the user discover potentially-valuable and relevant messages, conversations, documents, etc., that would not be returned by current string-based or single-format/single-protocol, index-based searching techniques.

Figure 1A:
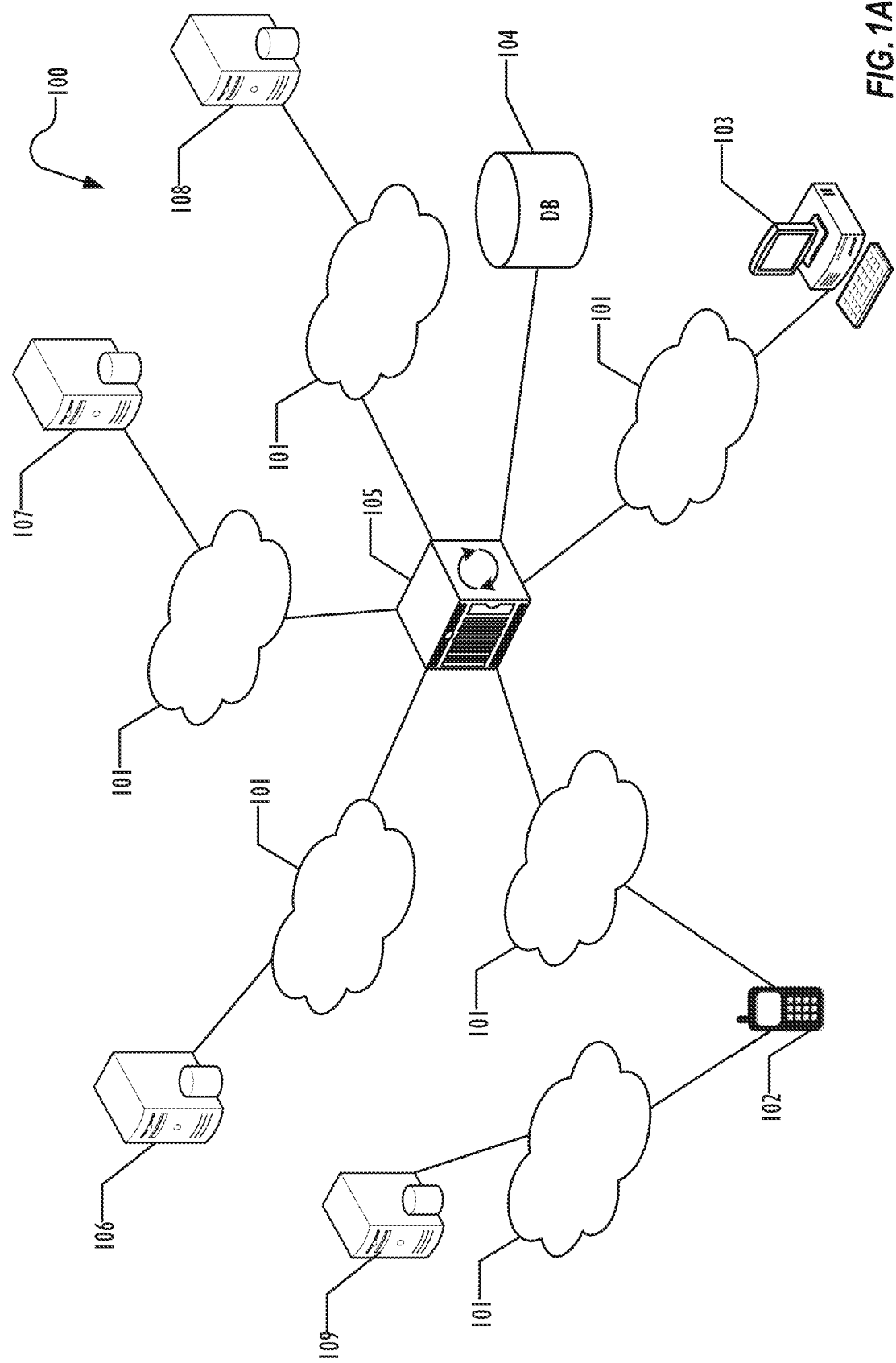
FIG. 1A is a block diagram illustrating a server-entry point network architecture infrastructure, according to one or more disclosed embodiments.

Referring now to FIG. 1A, a server-entry point network architecture infrastructure 100 is shown schematically. Infrastructure 100 contains computer networks 101. Computer networks 101 include many different types of computer networks available today, such as the Internet, a corporate network, or a Local Area Network (LAN). Each of these networks can contain wired or wireless devices and operate using any number of network protocols (e.g., TCP/IP). Networks 101 may be connected to various gateways and routers, connecting various machines to one another, represented, e.g., by sync server 105, end user computers 103, mobile phones 102, and computer servers 106-109. In some embodiments, end user computers 103 may not be capable of receiving SMS text messages, whereas mobile phones 102 are capable of receiving SMS text messages. Also shown in infrastructure 100 is a cellular network 101 for use with mobile communication devices. As is known in the art, mobile cellular networks support mobile phones and many other types of devices (e.g., tablet computers not shown). Mobile devices in the infrastructure 100 are illustrated as mobile phone 102. Sync server 105, in connection with database(s) 104, may serve as the central "brains" and data repository, respectively, for the multi-protocol, multi-format communication composition and inbox feed system to be described herein. In the server-entry point network architecture infrastructure 100 of FIG. 1A, centralized sync server 105 may be responsible for querying and obtaining all the messages from the various communication sources for individual users of the system and keeping the multi-protocol, multi-format inbox feed for a particular user of the system synchronized with the data on the various third party communication servers that the system is in communication with. Database(s) 104 may be used to store local copies of messages sent and received by users of the system, as well as individual documents associated with a particular user, which may or may not also be associated with particular communications of the users. As such, the database portion allotted to a particular user will contain a record of all communications in any form to and from the user.

Server 106 in the server-entry point network architecture infrastructure 100 of FIG. 1A represents a third party email server (e.g., a GOOGLE® or YAHOO! ° email server). (GOOGLE is a registered service mark of Google Inc. YAHOO! is a registered service mark of Yahoo! Inc.) Third party email server 106 may be periodically pinged by sync server 105 to determine whether particular users of the multi-protocol, multi-format communication composition and inbox feed system described herein have received any new email messages via the particular third-party email services. Server 107 represents a represents a third party instant message server (e.g., a YAHOO! ° Messenger or AOL® Instant Messaging server). (AOL is a registered service mark of AOL Inc.) Third party instant messaging server 107 may also be periodically pinged by sync server 105 to determine whether particular users of the multi-protocol, multi-format communication composition and inbox feed system described herein have received any new instant messages via the particular third-party instant messaging services. Similarly, server 108 represents a third party social network server (e.g., a FACEBOOK® or TWITTER® server). (FACEBOOK is a registered trademark of Facebook, Inc. TWITTER is a registered service mark of Twitter, Inc.) Third party social network server 108 may also be periodically pinged by sync server 105 to determine whether particular users of the multi-protocol, multi-format communication composition and inbox feed system described herein have received any new social network messages via the particular third-party social network services. It is to be understood that, in a "push-based" system, third party servers may push notifications to sync server 105 directly, thus eliminating the need for sync server 105 to periodically ping the third party servers. Finally, server 109 represents a cellular service provider's server. Such servers may be used to manage the sending and receiving of messages (e.g., email or SMS text messages) to users of mobile devices on the provider's cellular network. Cellular service provider servers may also be used: 1) to provide geo-fencing for location and movement determination; 2) for data transference; and/or 3) for live telephony (i.e., actually answering and making phone calls with a user's client device). In situations where two 'on-network' users are communicating with one another via the multi-protocol, multi-format communication system itself, such communications may occur entirely via sync server 105, and third party servers 106-109 may not need to be contacted.

Figure 1B:
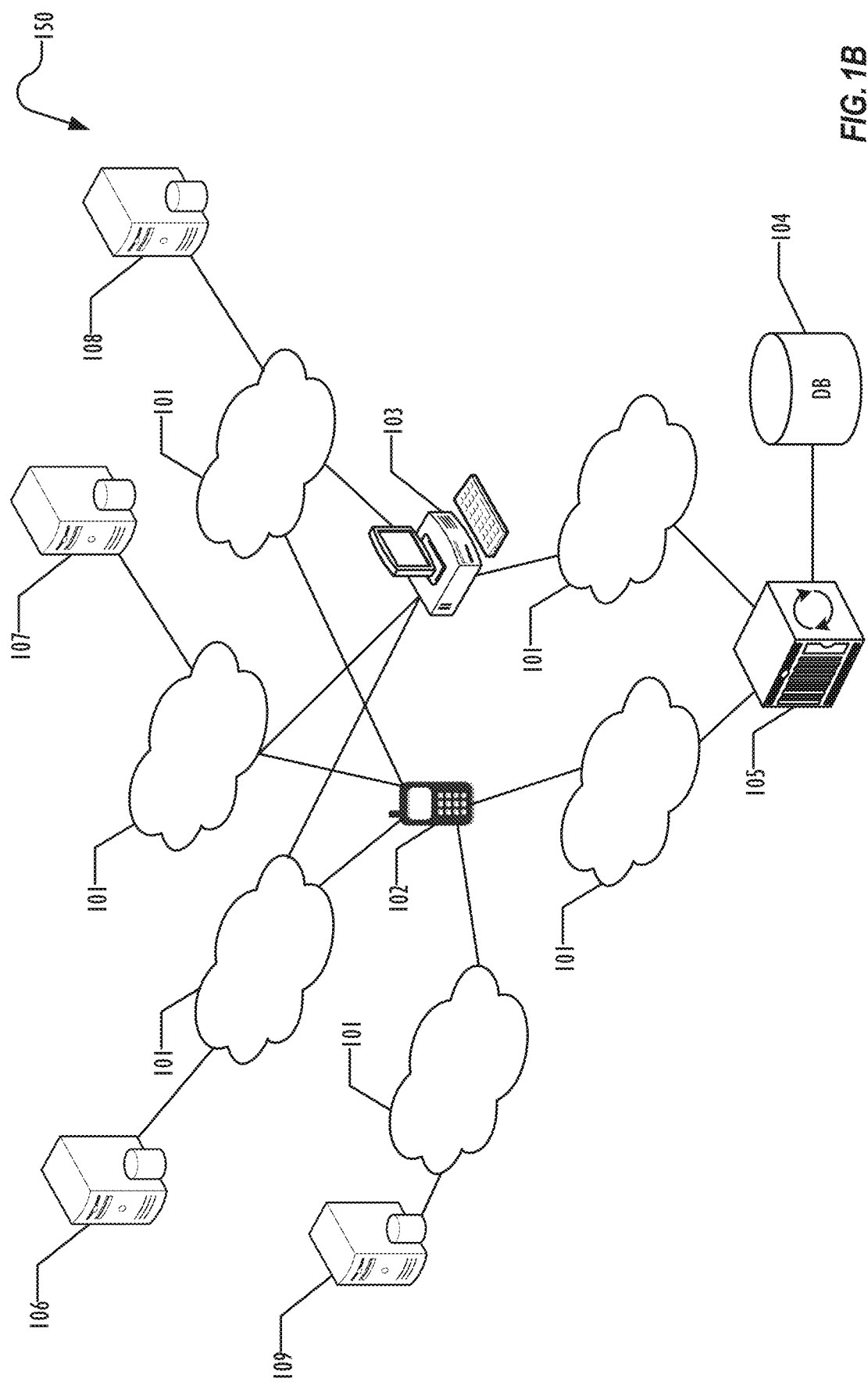
FIG. 1B is a block diagram illustrating a client-entry point network architecture infrastructure, according to one or more disclosed embodiments.

Referring now to FIG. 1B, a client-entry point network architecture infrastructure 150 is shown schematically. Similar to infrastructure 100 shown in FIG. 1A, infrastructure 150 contains computer networks 101. Computer networks 101 may again include many different types of computer networks available today, such as the Internet, a corporate network, or a Local Area Network (LAN). However, unlike the server-centric infrastructure 100 shown in FIG. 1A, infrastructure 150 is a client-centric architecture. Thus, individual client devices, such as end user computers 103 and mobile phones 102 may be used to query the various third party computer servers 106-109 to retrieve the various third party email, IM, social network, and other messages for the user of the client device. Such a system has the benefit that there may be less delay in receiving messages than in a system where a central server is responsible for authorizing and pulling communications for many users simultaneously. Also, a client-entry point system may place less storage and processing responsibilities on the central multi-protocol, multi-format communication composition and inbox feed system's server computers since the various tasks may be distributed over a large number of client devices. Further, a client-entry point system may lend itself well to a true, "zero knowledge" privacy enforcement scheme. In infrastructure 150, the client devices may also be connected via the network to the central sync server 105 and database 104. For example, central sync server 105 and database 104 may be used by the client devices to reduce the amount of storage space needed on-board the client devices to store communications-related content and/or to keep all of a user's devices synchronized with the latest communication-related information and content related to the user. It is to be understood that, in a "push-based" system, third party servers may push notifications to end user computers 102 and mobile phones 103 directly, thus eliminating the need for these devices to periodically ping the third party servers.

Figure 2A:
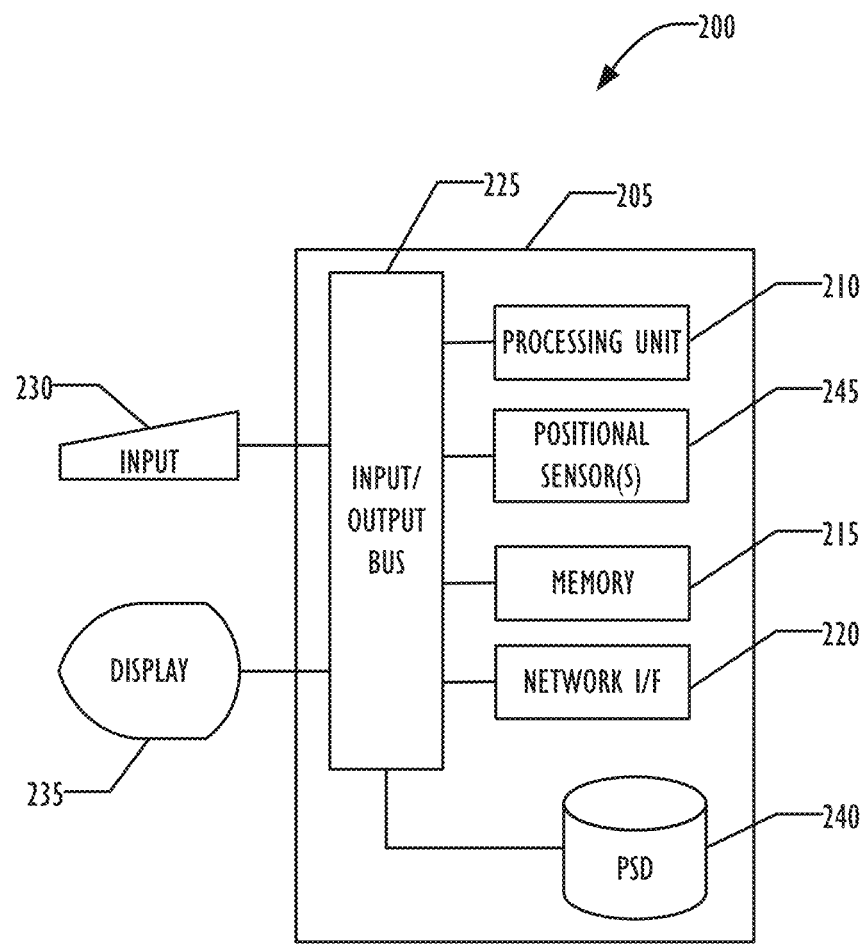
FIG. 2A is a block diagram illustrating a computer which could be used to execute the multi-format, multi-protocol contextualized indexing approaches described herein according to one or more of disclosed embodiments.

Referring now to FIG. 2A, an example processing device 200 for use in the communication systems described herein according to one embodiment is illustrated in block diagram form. Processing device 200 may serve in, e.g., a mobile phone 102, end user computer 103, sync server 105, or a server computer 106-109. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
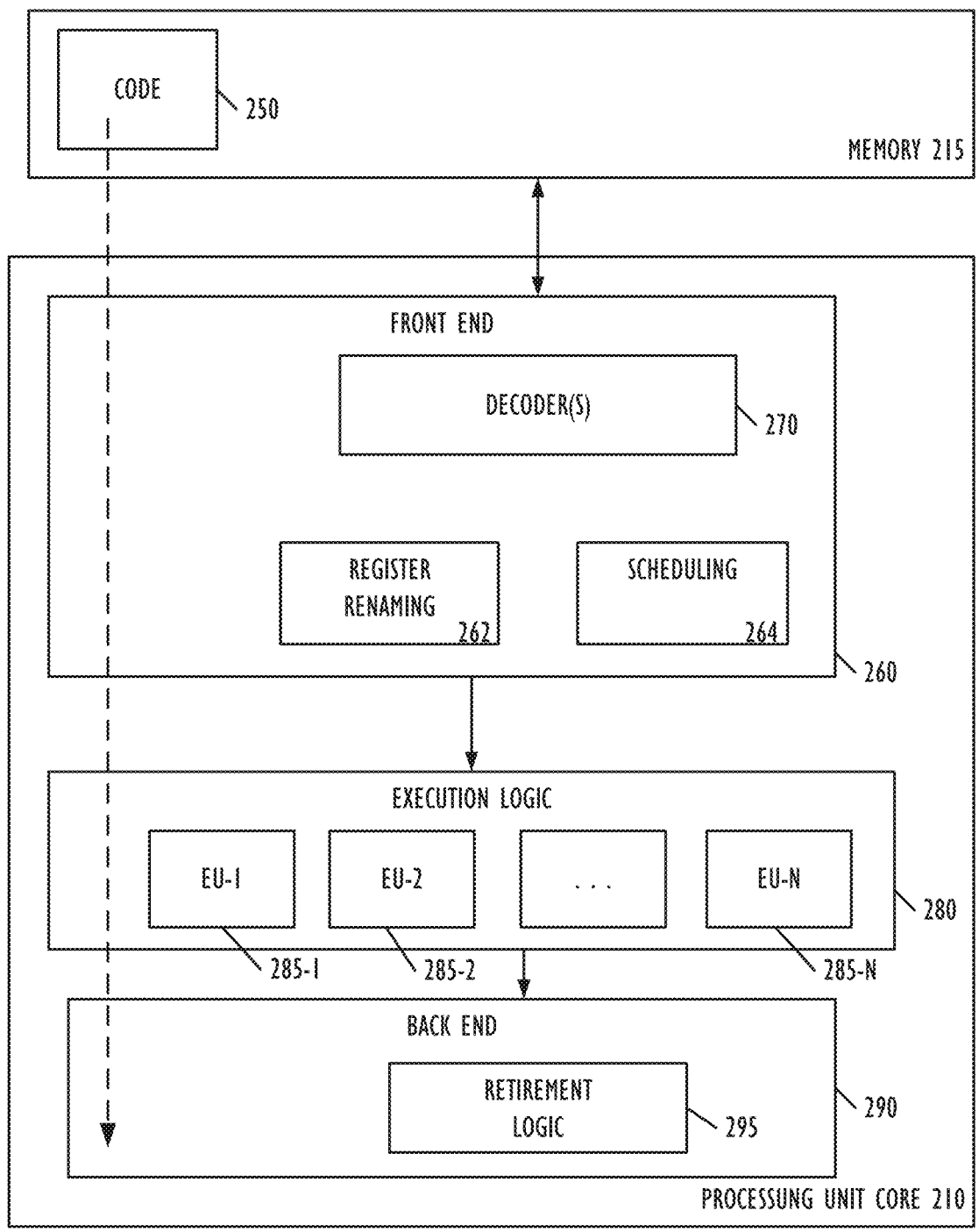
FIG. 2B is a block diagram illustrating a processor core, which may reside on a computer according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Multi-Protocol, Multi-Format Inbox Feed

Figure 3A:
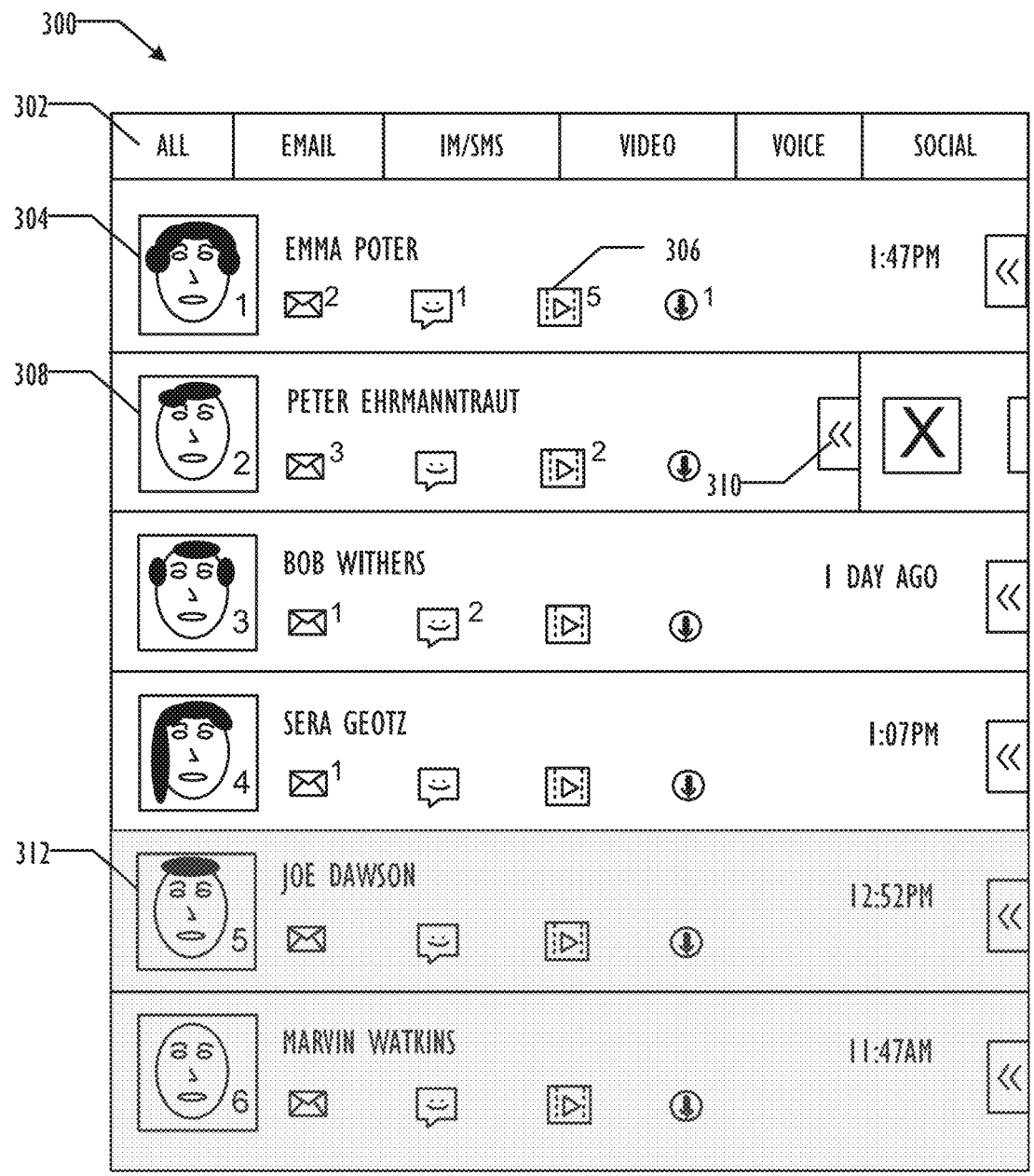
FIG. 3A shows an example of a multi-protocol, person-centric, multi-format inbox feed, according to one or more disclosed embodiments.

FIG. 3A shows an example of a multi-protocol, person-centric, multi-format inbox feed 300, according to one or more disclosed embodiments. The inbox feed 300 shown in FIG. 3A may, e.g., be displayed on the display of a mobile phone, laptop computer, or other computing device. In certain embodiments, elements of inbox feed 300 may be interacted with by a user utilizing a touchscreen interface or any other suitable input interface.

As is shown across the top row of the interface 302, the multi-format, multi-protocol messages received by a user of the system may be grouped by protocol (e.g., Email, IM/SMS, Video, Voice, etc.), or all messages may be combined together into a single, unified inbox feed, as is shown in FIG. 3A. Row 304 in the example of FIG. 3A represents the first "person-centric" message row in the user's unified inbox feed. As shown in FIG. 3A, the pictorial icon and name of the sender whose messages are listed in row 304 appear at the beginning of the row. The pictorial icon and sender name indicate to the user of the system that all messages that have been aggregated in row 304 are from exemplary user 'Emma Poter.' Note that any indication of sender may be used. Also present in row 304 are several graphical icons 306 that represent links to messages of different types that have been received from Emma Poter. For example, Emma Poter has sent the particular user whose inbox feed is shown in FIG. 3A two email messages, one instant message, five video messages, and one voice message. The user interface may utilize icons, as is shown in FIG. 3A, or it may use any other suitable form of indication, such as text, grids, charts, or any other form of personalized identification. The types of messages/communication used in the inbox feed may be selected or personalized, as well. The timestamp (e.g., 1:47 pm in row 304) may be used to indicate the time at which the most recently-received message has been received from a particular sender.

Moving down to row 308 of inbox feed 300, messages from a second user, Peter Ehrmanntraut, have also been aggregated into a single row of the feed. As is displayed on the right hand side of row 308 is reveal arrow 310. Selection of reveal arrow 310 may provide additional options to the user such as to reply, delay reply/delay send, forward, return a call, favorite, archive, or delete certain message from a particular sender. Further, the reveal action may conveniently keep the user on the same screen and allows for quick visual filtering of messages. Gestures and icon features may help the user with the decision-making process regarding the choice to reply, delay replying (including the time delaying of response across multiple protocols), delete, mark as spam, see a full message, translate, read, or flag a message as being unread. With respect to the "delay reply/delay send" option, the multi-protocol, multi-format communication system may determine, based on the determined outgoing message format and protocol, that a particular communication in a particular format (or that is being sent via a particular protocol) should be delayed before being sent to the recipient. For example, a video or voice message may not be appropriate to send at midnight, and so the system may delay sending the message until such time as the recipient is more likely to be awake, e.g., 9:00 am. On the other hand, if the outgoing message is in text format and being delivered via the SMS protocol, sending the message at midnight may be more socially-appropriate. Delay reply/delay send may also take into account the time zone of the recipient and choose a more socially-appropriate delivery time for a message based on the recipient's local time.

Finally, moving down to row 312, the 'grayed-out' characteristic of the row may be used to indicate that there are no remaining unread/unopened messages of any format or protocol type remaining from a particular sender. Alternately, each message type may be individually grayed out, indicating that there are no new messages of a particular type. It is to be understood that the use of a grayed out row is merely exemplary, and that any number of visual indicators may be used to inform the user of the device that no unread messages remain.

As may now be appreciated, the multi-protocol, person-centric, multi-format inbox feed 300 of FIG. 3A may provide various potential benefits to users of such a system, including: presenting email, text, voice, video, and social messages all grouped/categorized by contact (i.e., 'person-centric,' and not subject-people-centric, subject-centric, or format-centric); providing several potential filtering options to allow for traditional sorting of communications (e.g., an 'email' view for displaying only emails); and displaying such information in a screen-optimized feed format. Importantly, centralization of messages by contact may be employed to better help users manage the volume of incoming messages in any format and to save precious screen space on mobile devices (e.g., such a display has empirically been found to be up to six to seven times more efficient that a traditional inbox format). Further, such an inbox feed makes it easier for a user to delete unwanted messages or groups of messages (e.g., spam or graymail). The order of appearance in the inbox feed may be customized as well. The inbox feed may default to showing the most recent messages at the top of the feed. Alternatively, the inbox feed may be configured to bring messages from certain identified "VIPs" to the top of the inbox feed as soon as any message is received from such a VIP in any format and/or via any protocol. The inbox feed may also alert the user, e.g., if an email, voice message, and text have all been received in the last ten minutes from the same person—likely indicating that the person has an urgent message for the user. The inbox feed may also identify which companies particular senders are associated with and then organize the inbox feed, e.g., by grouping all communications from particular companies together.

In other embodiments, users may also select their preferred delivery method for incoming messages of all types. For example, they can choose to receive their email messages in voice format or voice messages in text, etc.

Figure 3B:
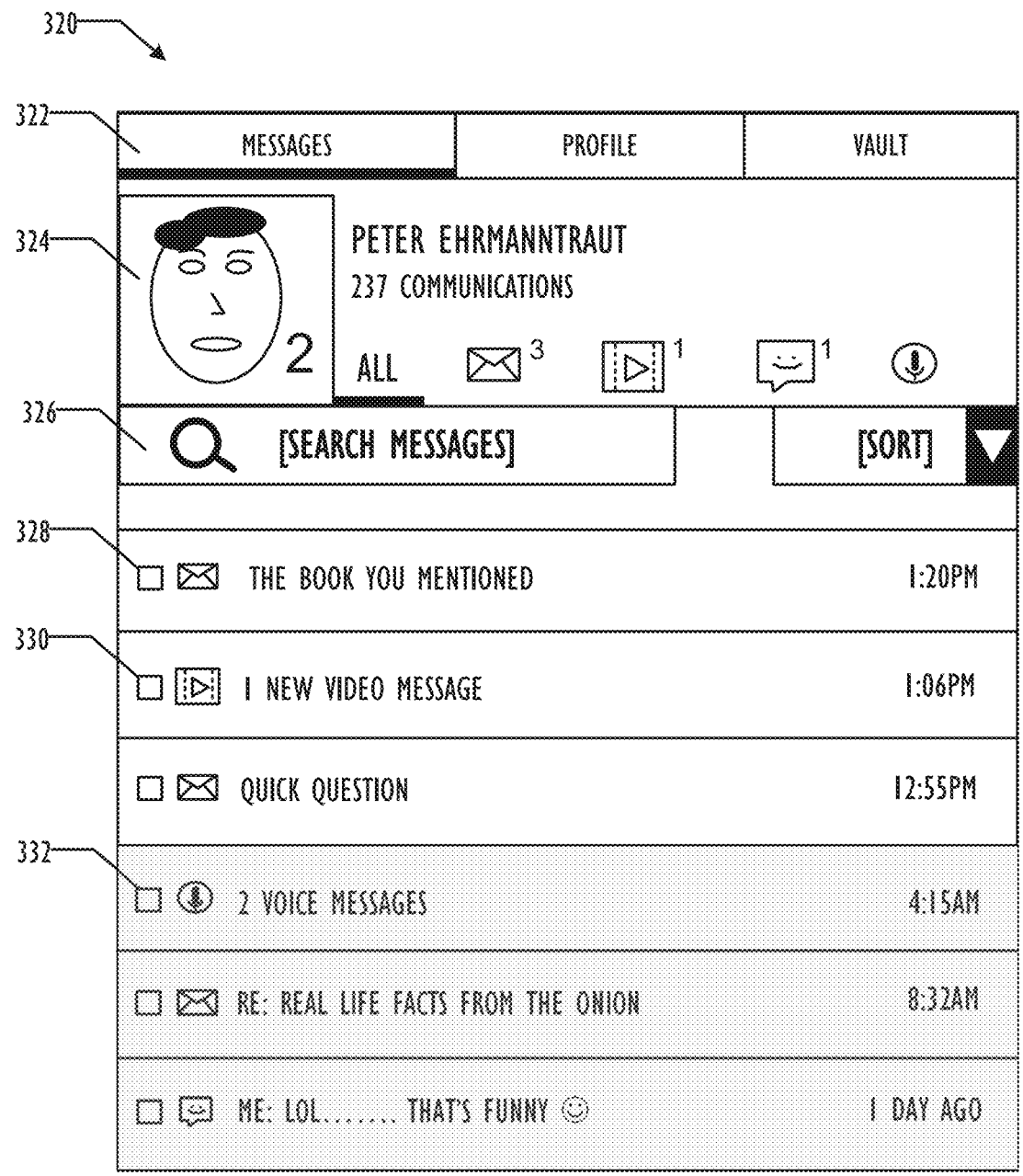
FIG. 3B shows an example of a multi-protocol, multi-format inbox feed for messages to and from a particular user, according to one or more disclosed embodiments.

Referring now to FIG. 3B, an example of a multi-protocol, multi-format inbox feed for messages to and from a particular user 320 is shown, according to one or more disclosed embodiments. As is shown across the top row of the interface 322, the messages from a particular user, in this case 'Peter Ehrmanntraut' may be displayed in a single multi-format, multi-protocol message feed. Row 322 in the example of FIG. 3B also presents the user with the opportunity to select the particular sender's 'Messages,' 'Profile,' or 'Vault' storage, which is a document repository of files shared between the user and a particular sender (e.g., email attachments, MMS, etc.). As shown in FIG. 3B, the pictorial icon 324 and name of the sender whose messages are listed in interface 320 appear at the top of the communications page. Also present in interface 320 is search icon 326, which may be activated to search across all message formats and protocols (e.g., including voice, video, SMS, and email messages) from a particular sender and/or for a particular search term(s) or topic, as will be described in further detail below. Message items may also be sorted in the feed by various characteristics such as time of receipt, format, or other content and/or semantic-based ranking schemes. Moving down to the messages portion of interface 320, checkbox 328 represents the first email message received from user Peter Ehrmanntraut, whereas checkbox 330 represents the first new video message from user Peter Ehrmanntraut. Finally, grayed-out checkbox 332 represents an aggregation of voice messages that have already been listened to by the user.

Figure 3C:
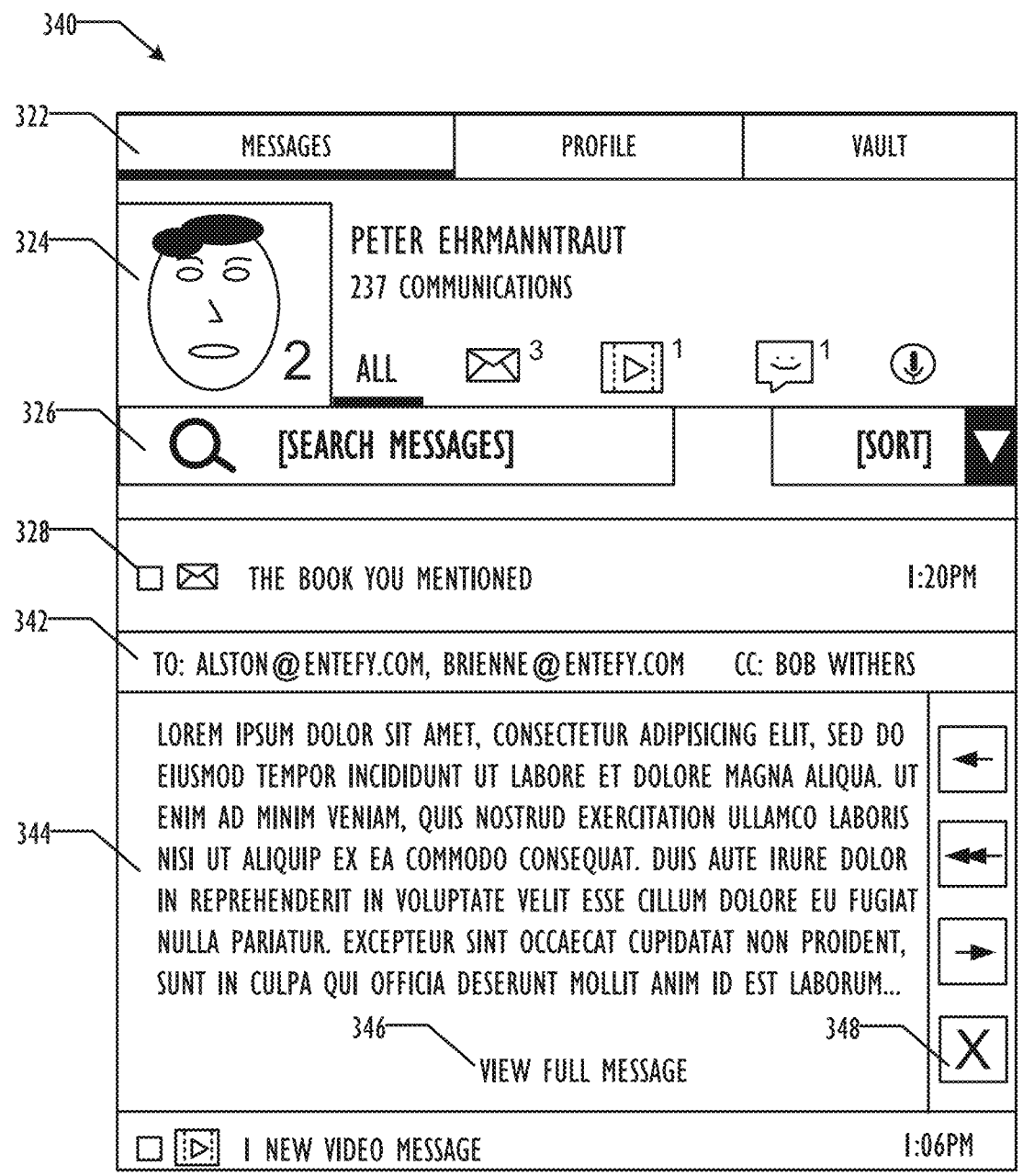
FIG. 3C shows an example of a preview pane for a multi-protocol, multi-format inbox feed for messages to and from a particular user, according to one or more disclosed embodiments.

Referring now to FIG. 3C, an example of a preview pane 340 for a multi-protocol, multi-format inbox feed for messages to and from a particular user is shown, according to one or more disclosed embodiments. As is displayed in FIG. 3C, the message associated with checkbox 328 has been opened to provide a more in-depth preview of the associated email text. According to some embodiments, the recipients 342 are listed out above the body 344 of the email, and a link 346 may be activated that causes the application to retrieve the full email message from either the system's sync server or third party email servers. The interface may also provide a number of preview quick action buttons 348 to be performed on the message that is being previewed, e.g., reply, reply all, forward, delete, etc.

Multi-Format, Multi-Protocol, Communication Threading System

As mentioned above, there are multiple ways by which the centralized communication system may associate or "stitch" together multiple messages across disparate messaging formats and protocols, creating a "relationship" between each associated message. Such relationships, which may be created uniquely for a variety of messages in a variety of formats and protocols through the system, may be used to create a "relationship map," i.e., a cluster of relationships connecting each message to other messages with varying degrees of separation. The relationship map may be analyzed to determine communication patterns (e.g., system-wide or on a per-user basis), provide greater search relevancy with messages across format/protocols, and provide other such insights and benefits.

According to a first embodiment, direct user actions taken in a centralized communications application may be used to associate messages as part of the same thread of conversation. For example, if a user has 'Message 1' open and clicks a 'Reply' button in the multi-format, multi-protocol communication application, thus opening a 'Message 2,' then the system may know to associate 'Message 1' and 'Message 2' together as being part of the same "thread," even if, for instance, 'Message 1' was received via an SMS protocol and 'Message 2' is eventually sent via an email protocol using the multi-format, multi-protocol communication application. Direct user actions taken from within the multi-format, multi-protocol communication application may be logged by the application, synced with the centralized communication server and any other properly-authenticated client(s), and stored for future recall when a user requests to see a "message thread" view.

According to a second embodiment, the system may use semantic matching (or other search-based/keyword message association techniques) to associate messages. A variety of semantic and search-based/keyword techniques for associating related messages will be discussed in further detail below in reference to FIGS. 4 and 5A-5D.

According to a third embodiment, element-matching techniques may be employed to associate messages. For example, messages that match each other based on subject lines or senders/recipient lists, or which have similar quoted text within them, etc., may be intelligently associated together—even if the centralized system has not been provided with data that otherwise affirmatively associates the messages together as being a part of the same messaging thread or chain. This embodiment will be discussed in further detail below in reference to FIG. 3G.

According to a fourth embodiment, "state-matching" techniques may be employed to associate messages. For example, certain third-party services which can integrate with the centralized communication system (hereinafter, a "Valid Third-Party Service") may specifically tag a message as a "Reply" to another message, and, thus, the centralized system may associate such messages as a part of the same thread or chain, even if the action to send the initial Reply message took place outside of the centralized communication system, i.e., was made directly via the Valid Third-Party Service's system.

One or more of the four techniques outlined above may be used in combination with each other in order for the system to most effectively thread together disparate messages across multiple formats and/or multiple protocols in a way that is most beneficial for the individual user of the centralized communication system.

Figure 3D:
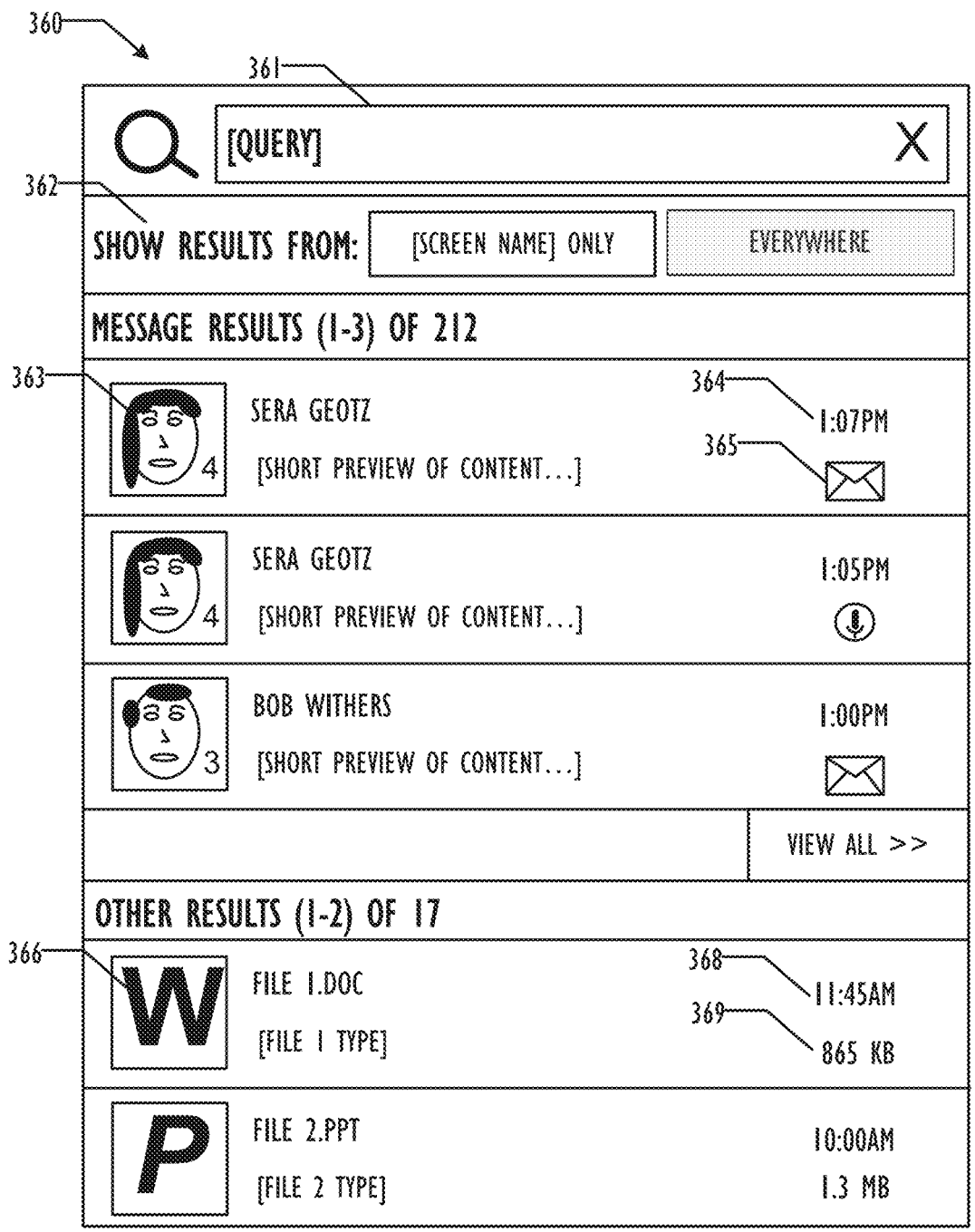
FIG. 3D shows an example of a multi-format, multi-protocol, contextualized communication search results page for a particular query, according to one or more disclosed embodiments.

Referring now to FIG. 3D, an example of a multi-format, multi-protocol threaded communication search results page 360 for a particular query is shown, according to one or more disclosed embodiments. At the top of the page 360 may be a search input box 361. A user may, e.g., enter his desired query string into the search input box 361 and then click on the magnifying glass icon to initiate the search process. Search results row 362 may be used for providing the user with a choice of additional search-related features. For example, the user may be provided with a selection between a "global" search, i.e., searching everywhere in the application's ecosystem, and a "narrow" search, i.e., searching only through content on a screen or small collection of screens. As shown in FIG. 3D, search results 363 may be displayed in a unified feed or grouped by type (e.g., messages, files, etc.), query type, search area selection (e.g., "global" v. "narrow"), or time. Each search result may optionally include an indication of the messages format 365 and/or a time stamp 364 to provide additional information to the user. A given implementation may also optionally employ an "Other Results" feed 366 as a part of the same user interface that displays the search results 363. These results could come from sources other than traditional message-related sources, e.g., a user's personal file collection stored with a central database, personal profile information from contacts of the user, etc.

Figure 3E:
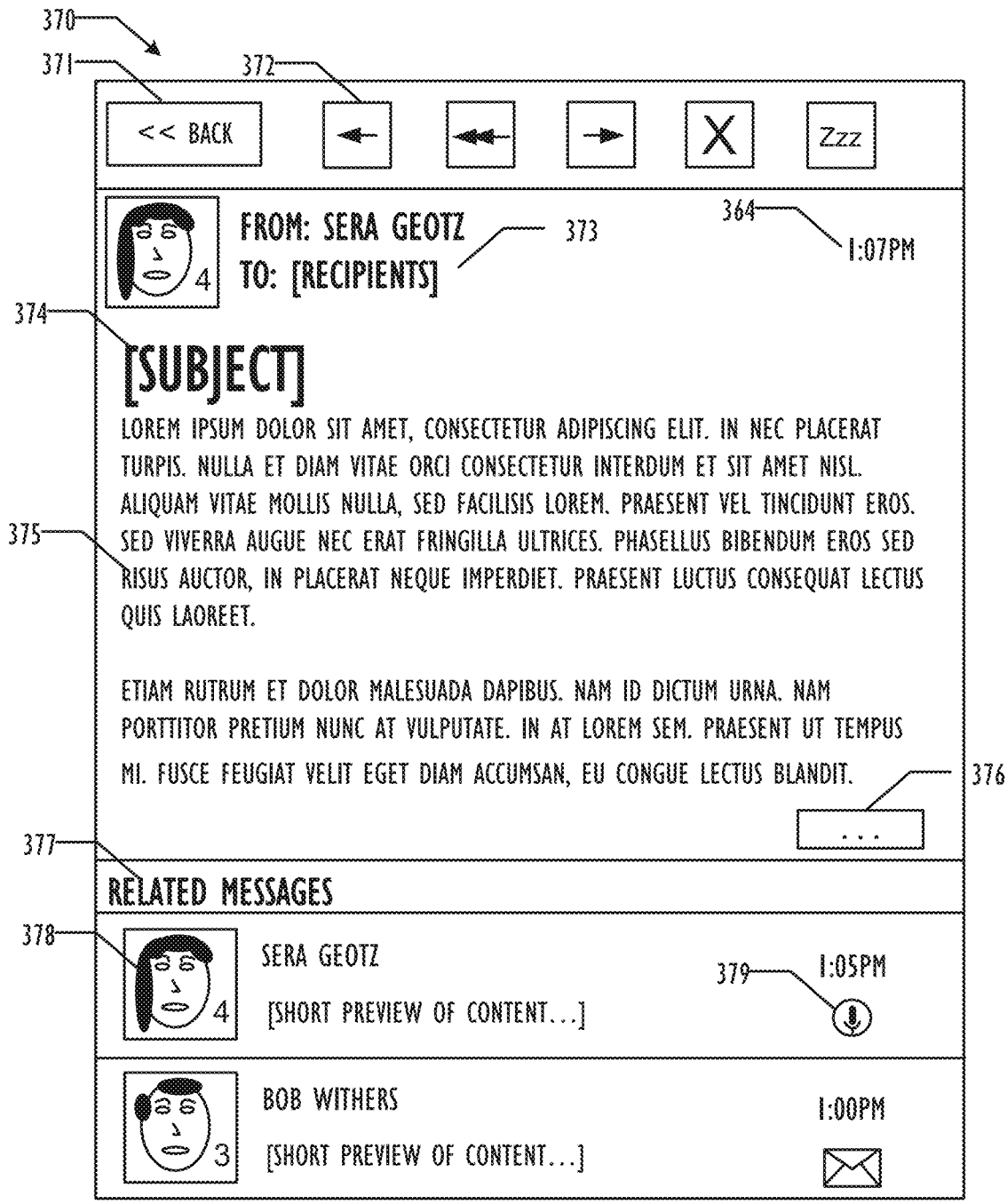
FIG. 3E shows an example of a stitching view mode for a multi-format, multi-protocol communication system, according to one or more disclosed embodiments.

Referring now to FIG. 3E, an example of a stitching view mode for a multi-format, multi-protocol communication system 370 is shown, according to one or more disclosed embodiments. According to some embodiments, across the top of the user interface may be located various user interface elements such as a "Back" button 371, and other message action buttons 372 (e.g., reply, reply all, forward, delete, sleep, archive, etc.). Next, the active message 373 content may be displayed in a portion of the screen, including a subject line 374, message content 375, time stamp 364, and optionally a quoted text button 376, which may be activated by the user to display previous conversation history, such as old emails in the thread, full SMS trails, etc. A given implementation may also optionally employ a "Related Messages" feed 377 as a part of the same user interface that displays the selected message 373. These related messages 378 could include parsed content from the body of the selected messages (i.e., previously recorded replies and forwards), as well as messages across other formats and protocols (represented by icon 379), such as voice messages, SMS conversations, and phone call log entries.

Figure 3F:
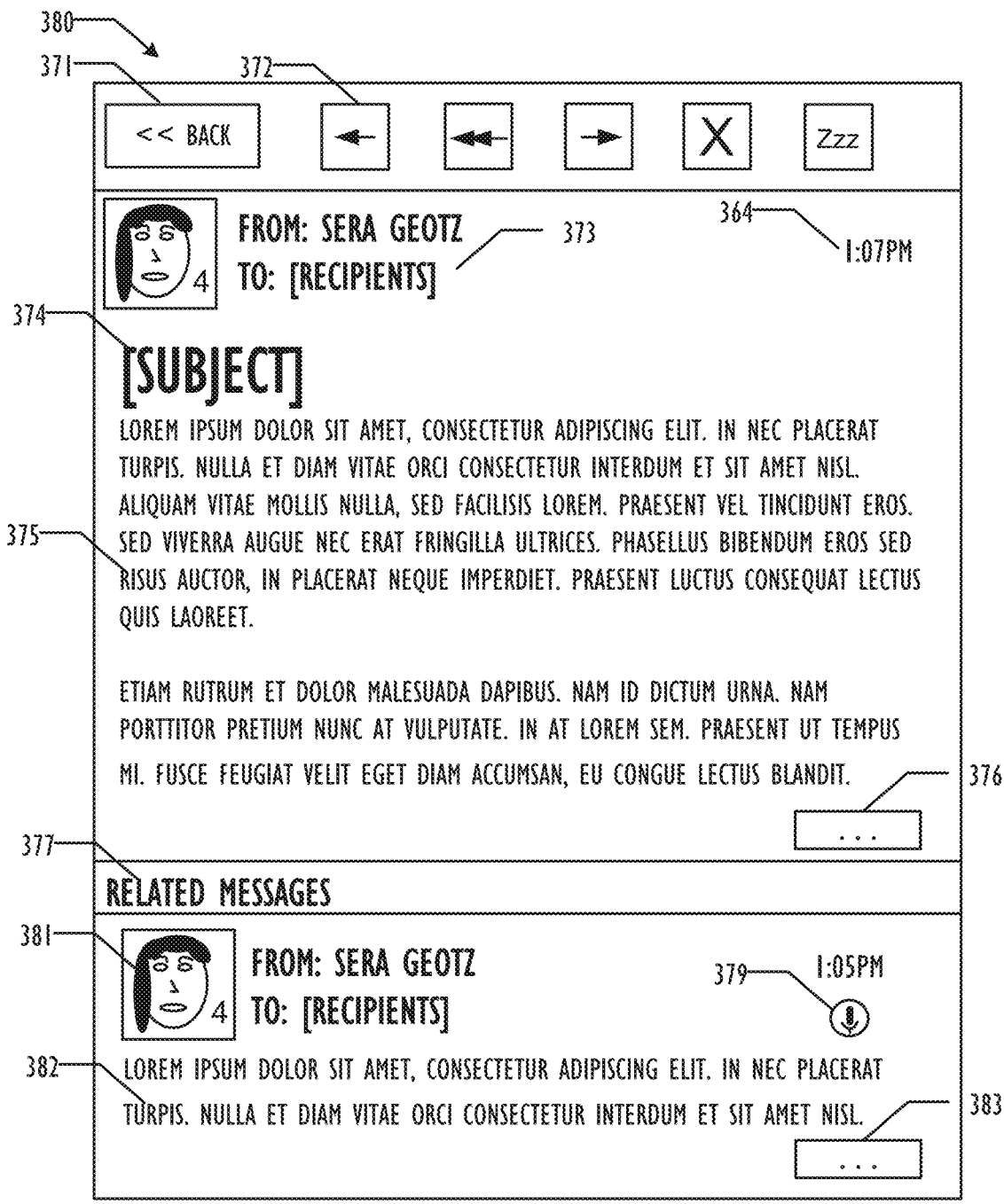
FIG. 3F shows an example of a stitching view mode with an expanded message for a multi-format, multi-protocol communication system, according to one or more disclosed embodiments.

Referring now to FIG. 3F, an example of a stitching view mode with an expanded message for a multi-format, multi-protocol communication system 380 is shown, according to one or more disclosed embodiments. Related message preview 381 may be displayed on the screen, e.g., in response to the user selecting a particular related message 378 from the related messages feed 377. Related messages previews can be selected by the user to open the full details of a message without leaving the threaded results screen. A quoted text button 383 may also be activated by the user to display additional content from the related message. Options to further explore original content may also be made available to the user via the related message 381 interface, e.g., taking the user to see the original SMS thread belonging to the single SMS message shown in the related message 381 interface.

Figure 3G:
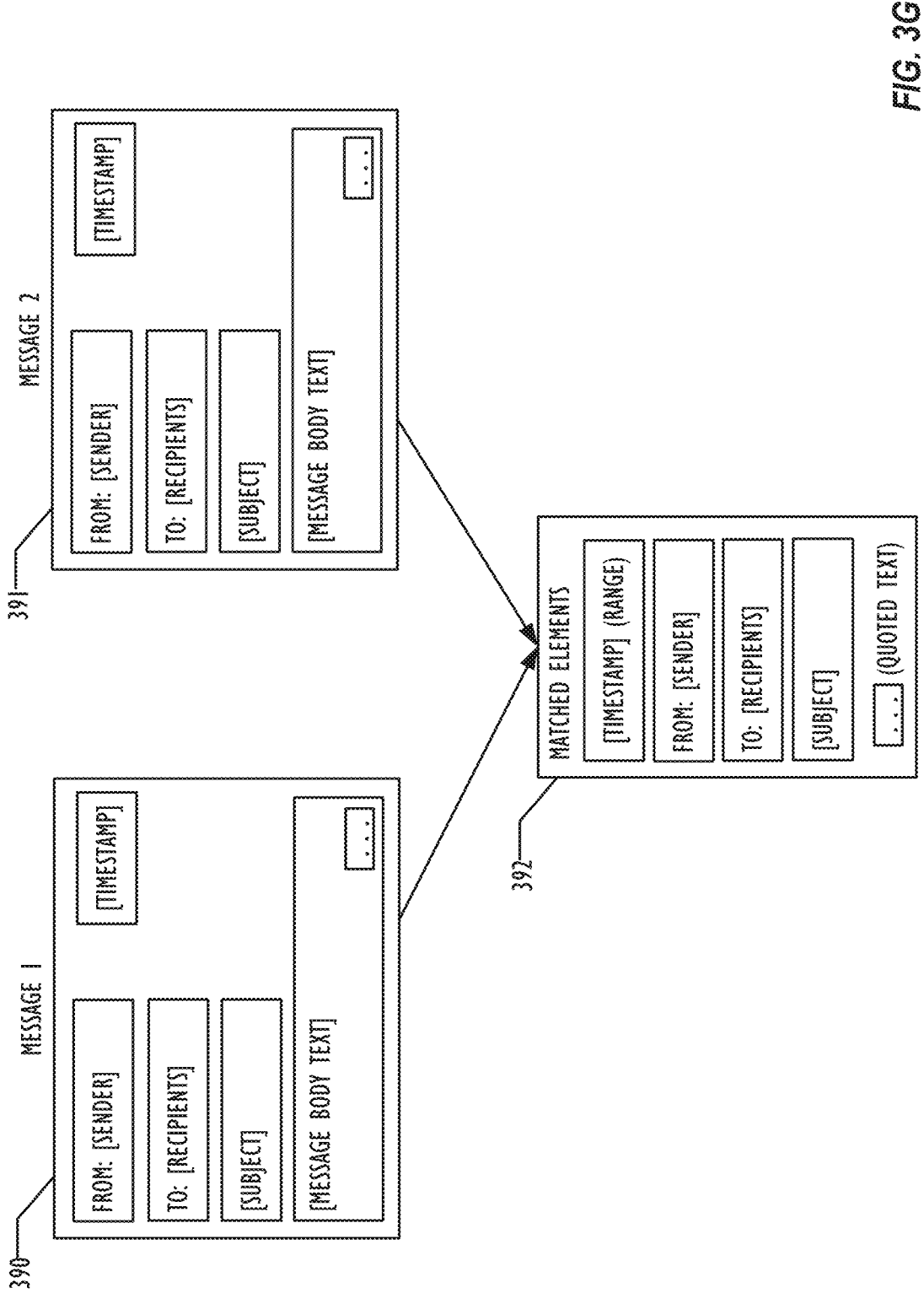
FIG. 3G shows an example of element matching for a stitching view mode for a multi-format, multi-protocol communication system, according to one or more disclosed embodiments.

Referring now to FIG. 3G, an example of element matching for a stitching view mode for a multi-format, multi-protocol communication system is shown, according to one or more disclosed embodiments. As mentioned above, element matching may seek to associate otherwise unassociated messages by matching on subject lines, senders/recipient lists, quoted text, etc. Thus, as shown in FIG. 3G, Message 1 390 and Message 2 391 may each include elements such as: a sender, a recipient list, a subject line, a timestamp, and a message body text. The matched elements 392 that the system may determine Message 1 390 and Message 2 391 to have in common may then include, but not be limited to: timestamp (e.g., within a particular range), sender, recipient list (e.g., a certain number of recipients in common), and quoted text (e.g., a certain amount of message body text in common). Based on these matched elements, the system may intelligently determine that Message 1 390 and Message 2 391 are associated with one another and belong as part of the same thread of communication. The messages may thus be displayed in an appropriate and beneficial manner to the user, even if Message 1 390 and Message 2 391 come from vastly different messaging protocols and/or have different formats.

Multi-Format, Multi-Protocol, Communication Indexing and Searching

Figure 4:
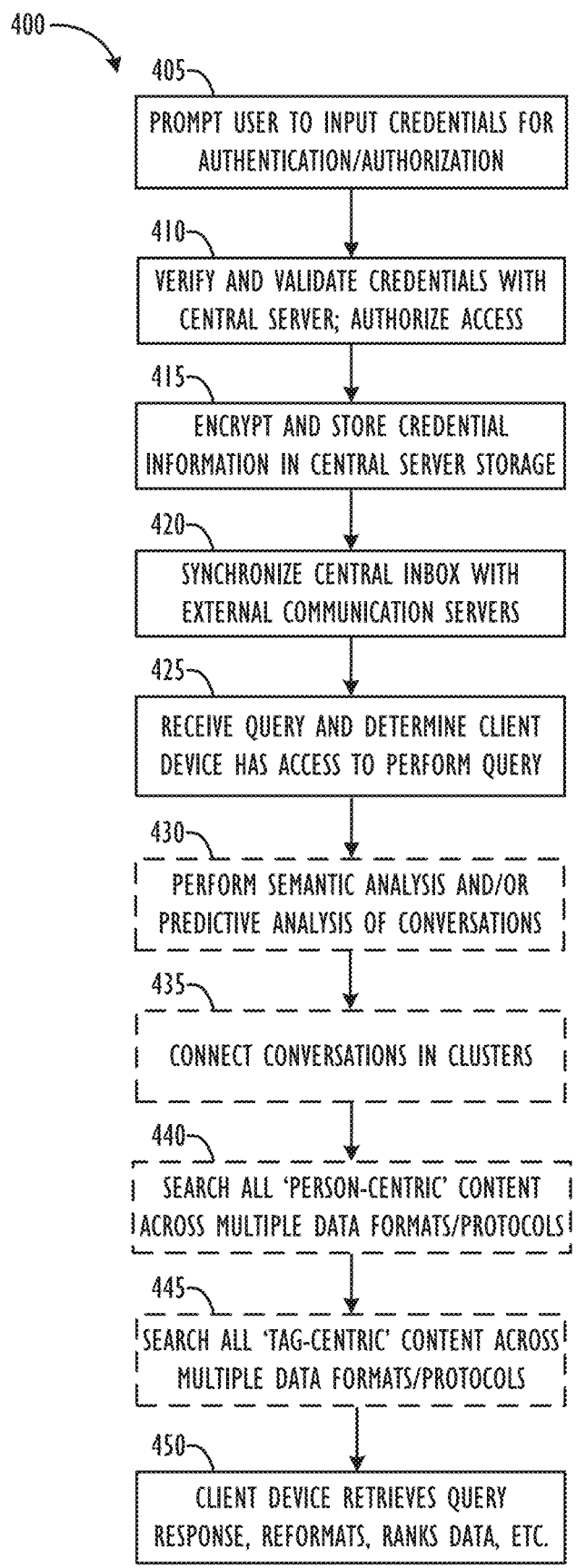
FIG. 4 is a flowchart of one embodiment of a method performing a multi-format, multi-protocol, contextualized communication search, according to one or more disclosed embodiments.

FIG. 4 shows a flowchart 400 of one embodiment of a method of performing a multi-format, multi-protocol, contextualized communication search, according to one or more disclosed embodiments. First, the system may prompt the user to input his or her credentials so that he or she may be authenticated and authorized (Step 405). Next, the sync server 105 and/or third-party servers 106-109 may verify and validate the user's credentials as being authorized to receive communications associated with a particular account(s) tied to a particular messaging service(s) (Step 410). Next, the user's credentials may be encrypted and stored at the sync server 105 so that the user's messages may continue to be retrieved by the system (Step 415). It is to be understood that any suitable authentication framework, such as OAuth, may be used to authenticate the user's credentials and that the credentials need not necessarily be stored at the sync server. Once the user's credentials have been verified and stored, the system may attempt to synchronize the user's multi-protocol, person-centric, multi-format unified messaging inbox feed with the various external communication servers hosting the user's messages from the various third-party messaging services, e.g., by using one or more third-party credentials of the first user stored at the sync server (Step 420). Next, the system may receive a query from a particular user's client device (e.g., to pull new communications directed to the user) and determine that the client device has access to perform the query (Step 425).

Assuming the client device has access, in one embodiment, the query will be sent to a central server(s) of the multi-format, multi-protocol, contextualized communication search system, and, based on the nature of the query, a semantic analysis and/or predictive analysis of the query terms may be performed (Step 430). In such a "server-centric" approach, the central server(s) run search logic through a centralized content database, and the central server(s) may perform real-time relevancy ranking. The results (along with the rankings) may then be sent to the client, so that the client may display the results to a user. This "server-centric" approach may allow for enhanced speed and consistency across clients and services, and may also allow for greater richness in index data modeling. Other query implementations may utilize a more "client-centric" approach. In such a "client centric" approach, a user inputs a query on a client device, and then the client device may run search logic through a client database, allowing the client device to perform real-time relevancy ranking, and display the results on the client device. This option allows for enhanced user privacy, but may sacrifice speed. Still other query implementations may utilize a "hybrid" search architecture, which may comprise a combination of the "server-centric" and "client-centric" approaches outlined above. A "hybrid" architecture may be of particular value when the client device is either not connected to the Internet or when the two databases (i.e., the client database and server database) are not in perfect sync.

As discussed above, a semantic analysis may be performed on extant content on client devices, the system servers, and/or third-party content host servers in order to determine the particular keywords that are relevant and related to the subject matter of a given query(ies), document(s), or communication(s), etc. These keywords may be used to generate a "tag cloud" associated with the given query(ies), document(s), or communication(s), etc. These tag clouds may then themselves be used to generate further "predictive tag clouds," based on the particular content of the words in the generated tag cloud, as will be described in further detail below. The tag clouds and predictive tag clouds may then be used to "stitch" together, i.e., associate, related query(ies), document(s), or communication(s), etc. into "clusters" (Step 435).

Once the related query(ies), document(s), or communication(s), etc. have been connected together via the above-described searching process, the user's query may be executed. For example, if the user's query is asking for all content related to a particular second user, the system may search all 'person-centric' content across multiple data formats and/or protocols related to the particular second user (Step 440). For example, if the user clicked on row 308 shown in FIG. 3A, a row which is associated with user 'Peter Ehrmanntraut,' the system could retrieve all the identified emails, video messages, instant messages, voice messages, social media messages, etc. to or from user 'Peter Ehrmanntraut,' resulting in, e.g., the screen 320 from FIG. 3B being displayed on a display screen of the client device of the user that issued the query.

If the user's query is asking for all content related to a particular topic(s) that the user has discussed with user 'Peter Ehrmanntraut,' the system may search all 'tag-centric' content across multiple data formats related to the particular topic(s) (Step 445). For example, if the user typed the term 'book' into search box 326 shown in FIG. 3B, the system could retrieve all the identified emails, video messages, instant messages, voice messages, social media messages, etc. from user 'Peter Ehrmanntraut,' having a tag cloud including the term 'book' or a predictive tag cloud including the term 'book,' resulting in, e.g., the screen 360 from FIG. 3D being displayed on a display screen of the client device of the user that issued the query.

Once all the query-relevant, contextualized multi-format, multi-protocol data has been located by the server, packaged, and then sent to the client device issuing the query, the client device retrieves the information, reformats it (if applicable), ranks or sorts it (if applicable), and displays the information on a display screen of the client device (Step 450).

Figure 5A:
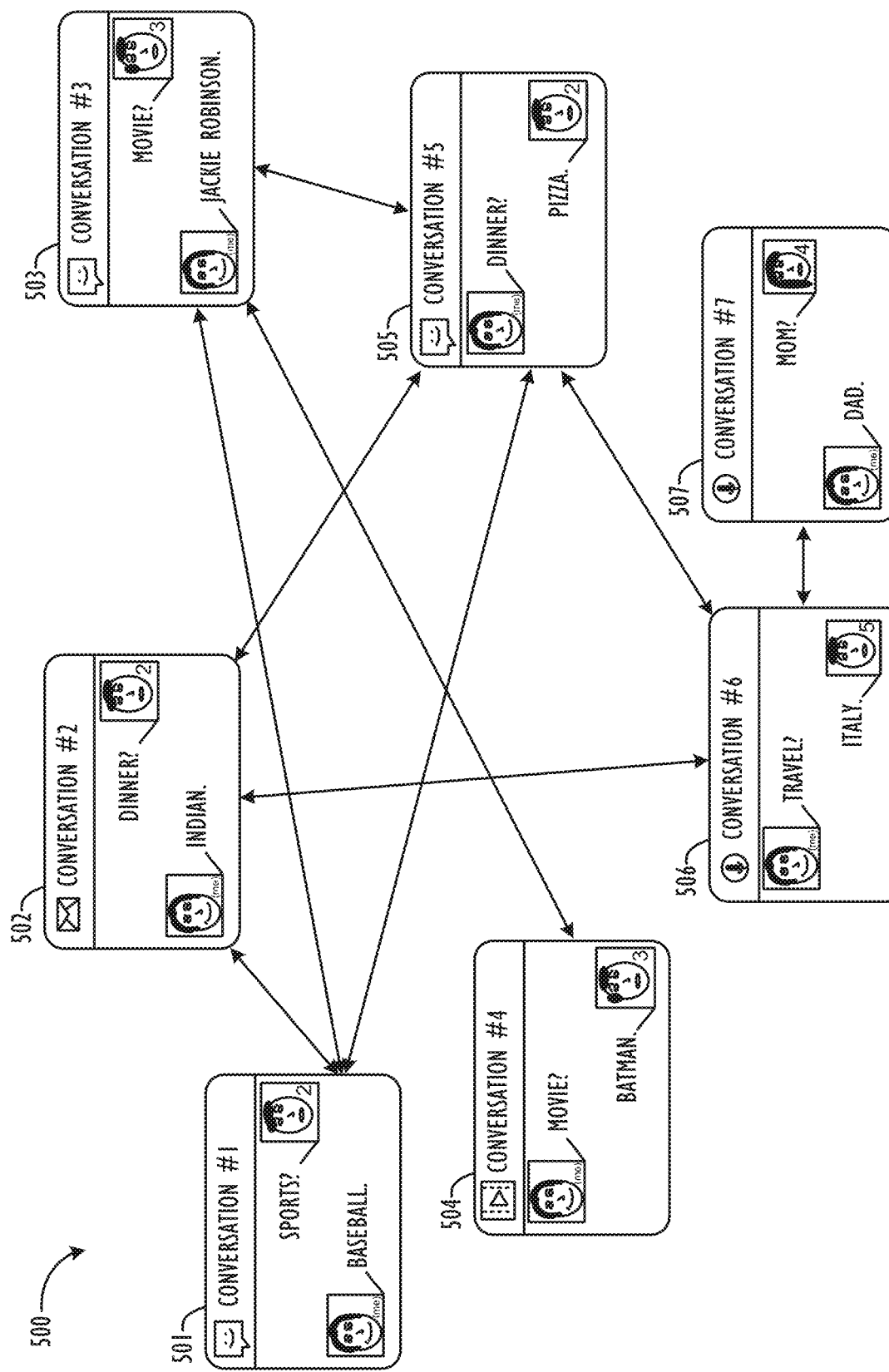
FIG. 5A shows an example of communications clustering, according to one or more disclosed embodiments.

FIG. 5A shows an example of communications clustering 500, according to one or more disclosed embodiments. Exemplary communications clusters 500 are comprised of seven individual conversations, 501-507. For example, Conversation #1 501 comprises an instant messaging conversation between the user of the client device (appearing on the left-hand side of the conversation box) and user 'Peter Ehrmanntraut' (appearing on the right-hand side of the conversation box). Conversation #1 appears to be a conversation about sports generally, and baseball in particular. Conversation #2 502 comprises an email conversation that is also between the user of the client device (appearing on the left-hand side of the conversation box) and user 'Peter Ehrmanntraut' (appearing on the right-hand side of the conversation box). Conversation #2 appears to be a conversation about dinner generally, and Indian food in particular. Conversation #3 503 comprises an instant messaging conversation between the user of the client device (appearing on the left-hand side of the conversation box) and user 'Bob Withers' (appearing on the right-hand side of the conversation box). Conversation #3 appears to be a conversation about movies generally, and a movie about Jackie Robinson in particular. Conversation #4 504 comprises a video message conversation between the user of the client device (appearing on the left-hand side of the conversation box) and user 'Bob Withers' (appearing on the right-hand side of the conversation box). Conversation #4 appears to be a conversation about movies generally, and Batman in particular. Conversation #5 505 comprises an instant messaging conversation between the user of the client device (appearing on the left-hand side of the conversation box) and user 'Peter Ehrmanntraut' (appearing on the right-hand side of the conversation box). Conversation #5 appears to be a conversation about dinner generally, and pizza in particular. Conversation #6 506 comprises a voice message conversation between the user of the client device (appearing on the left-hand side of the conversation box) and user 'Joe Dawson Withers' (appearing on the right-hand side of the conversation box). Conversation #6 appears to be a conversation about travel generally, and Italy in particular. Finally, Conversation #7 507 comprises a voice message conversation between the user of the client device (appearing on the left-hand side of the conversation box) and another user (appearing on the right-hand side of the conversation box), who, in this case, may not be a current contact of the user of the client device. Conversation #7 appears to be a conversation about family generally, and moms and dads in particular. Note that, to attain semantic contextual information from communications in certain data formats (e.g., video or voice), an intermediary transcription step may be required to convert the audio content of the message into textual content that may be indexed, semantically and predictively analyzed, and, ultimately, clustered and searched upon.

Various conversations in FIG. 5A are shown as being "clustered" together, as represented by the bi-directional arrows connecting the various conversation boxes. Clustering may be used to connect conversations in a more rich and contextual fashion than is provided by a simple linear interface (i.e., message, reply, surreply, etc.). Some of the conversations in FIG. 5A appear clustered for obvious reasons, but others are clustered for more subtle contextual and semantic reasons. For example, Conversation #1 501 is stitched together with Conversation #2 502 and Conversation #5 505 because the other party to the conversation, 'Peter Ehrmanntraut,' is in common among each conversation. Conversation #1 501 is stitched together with Conversation #3 503, however, because of a similarity in message protocol, i.e., both conversations are in an instant messaging protocol and because of a similarity in content, i.e., baseball and Jackie Robinson may be deemed by the system to be semantically-related topics. It is to be understood that, based upon the query, certain communications that are clustered together may be excluded from the query. For example, even though Conversation #1 501 and Conversation #3 503 are clustered together, if the search query is for all content related to user 'Peter Ehrmanntraut,' then Conversation #3 503 may not be returned by the query since its only link to Conversation #1 501 was based on protocol type and subject matter content.

Moving on to Conversation #2 502, it is further clustered with Conversation #6 506 based on the fact that each conversation mentions a country (India,' in the case of Conversation #2 502, and 'Italy' in the case of Conversation #6 506), and these tags have been predictively semantically linked with one another in the example shown in FIG. 5A, perhaps because they both relate to potential travel destinations, potential food categories, or the like. Conversation #2 502, is further clustered with Conversation #5 505 based on the fact that each conversation relates to the topic of dinner.

Moving on to Conversation #3 503, it is further clustered with Conversation #4 504 based on the fact that each conversation mentions a movie (Jackie Robinson,' in the case of Conversation #3 503, and 'Batman' in the case of Conversation #4 504), and these tags have been predictively semantically linked with one another in the example shown in FIG. 5A. Conversation ##503, is further clustered with Conversation #5 505 based on the fact that each conversation is in instant messaging format.

Moving on to Conversation #5 505, it is further clustered with Conversation #6 506 based on the fact that each conversation mentions a topic that has been semantically-linked to the concept of 'Italy' (pizza,' in the case of Conversation #5 505, and the word 'Italy' itself in the case of Conversation #6 506).

Finally, Conversation #6 506, is further clustered with Conversation #7 507 based on the fact that each conversation is in a video messaging format.

Figure 5B:
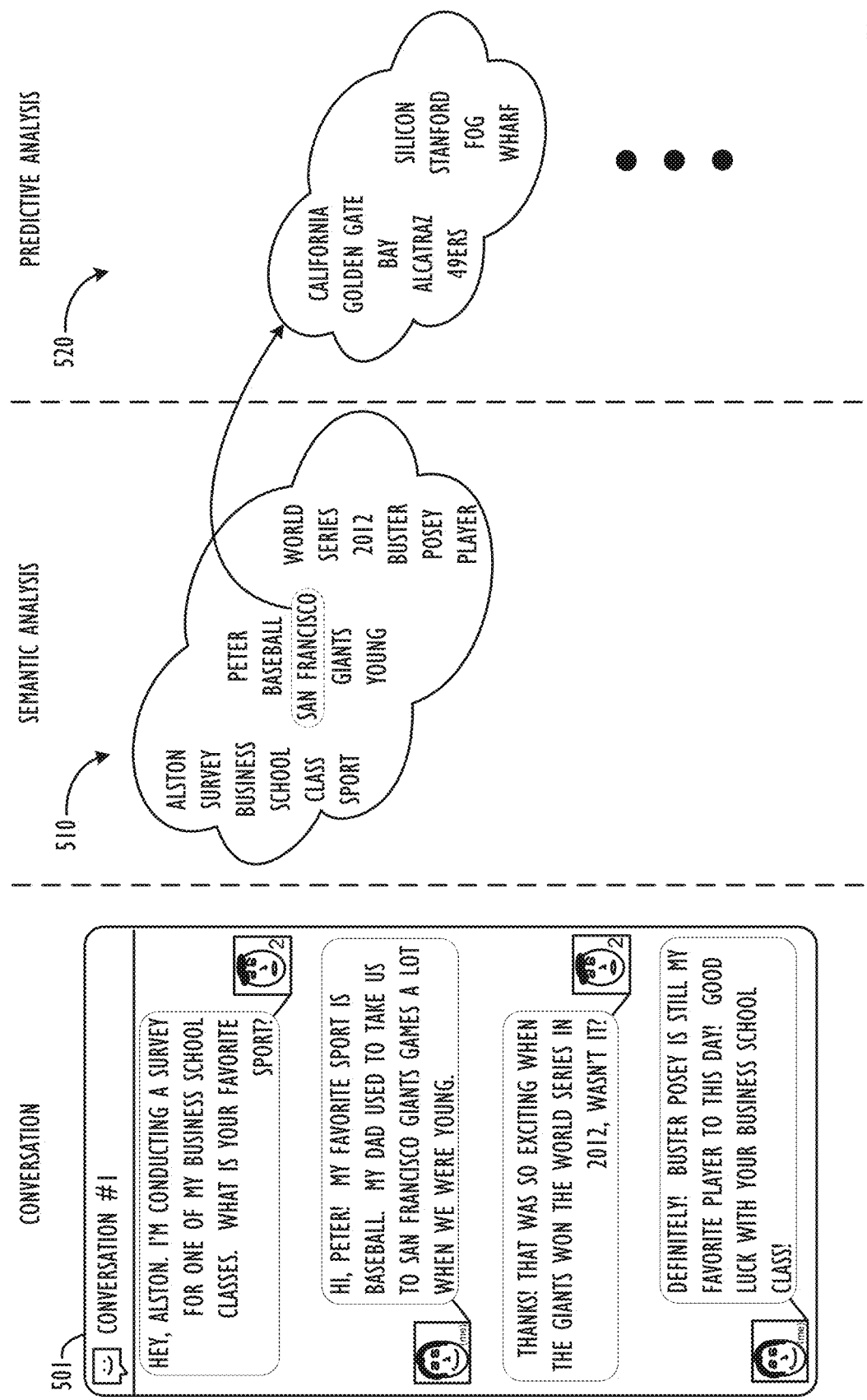
FIG. 5B shows an example of communications semantic analysis and predictive analysis, according to one or more disclosed embodiments.

FIG. 5B shows an example of communications semantic analysis and predictive analysis, according to one or more disclosed embodiments. Beginning on the left-hand side of FIG. 5B, an expanded view of Conversation #1 501 is shown. Based on a semantic analysis of the content of Conversation #1 501, the tag cloud 510 has been generated, comprising the keywords relating to the main semantic topics expressed in Conversation #1 501. As may be seen, tag cloud 510 comprises mainly nouns, including names, dates, places, and proper nouns. Less important words and connective words, such as "a," "for," "my," "what," "is," etc. are not deemed semantically important enough to be included in tag cloud 510 representing the content of Conversation #1 501.

Based off each word in tag cloud 510, and additional predictive analysis may be performed, resulting in predictive tag cloud 520. In the example of FIG. 5B, the predictive tag cloud for the word "San Francisco" is shown. The predictive tag clouds may be used by the system to stitch together conversations, documents, or communications that a user may not have even considered to be relevant to his or her query, thus revealing additional potential business and/or personal value to the user.

As the centralized messaging database grows, it will become possible for the system to rely more and more on its own data to drive the initial tag cloud and predictive tag cloud algorithms. For example, if a particular user always begins emails with, "Hope you're doing well," the system could determine that it was not necessary to repeatedly index that phrase, and instead simply keep a note of a reference to the original phrase. This process of contextual learning may be employed for an individual user's content, as well as across global content stored in the centralized messaging database (e.g., the world may say, "Congratulations on the new baby!" phrase quite often). This process may allow for less duplication, smaller index sizes, etc.

Further, contextual learning may be used to determine that a particular user has recently started to using one phrase in place of another, e.g., if the user just spent a year living in London, he or she may being to use the phrase "to let" instead of "for rent." In such a situation, a machine learning system using contextual cues could determine that, for that the particular user only, the phrases "to let" and "for rent" are considered like terms and, therefore, would share word mapping. This way, when the user searches for "rent," the system can include references to "let" as potentially relevant matches. Another machine learning technique(s) that may be employed include techniques to influence index term weight assignment. For example, a particular user's searches may indicate that "time" is not a significant search parameter for the user. In other words, the particular user may only really search for content within a one-week timeframe of the present date. The centralized system could monitor such behaviors and adjust the index weights at regular or semi-regular intervals accordingly to assign greater weight to the timestamp on recent content and reduce the weight when timestamps are "old" for that particular user, thus allowing the system to provide a more customized and relevant search experience. By employing these customized contextual learning techniques, the end result is that the same content, e.g., an email sent from User A to User B, could have two different index mappings in the centralized system so that both User A and User B can have an optimized search/threading experience. The system could also perform machine-learning techniques based on historic patterns of communication to influence predictive threading. For example, in protocols where data is limited, e.g. SMS, the system could employ a historic look-back on the User's communication in order to determine the likelihood of a conversation to/from the User pervading across multiple protocols. That assigned weight pertaining to the likelihood of a conversation 'jumping' protocol could then impact the stitching results for that User. In this way, the system is able to apply machine-learning techniques on an individual level in order to provide the most relevant search results to the user across formats and protocols.

Figure 5C:
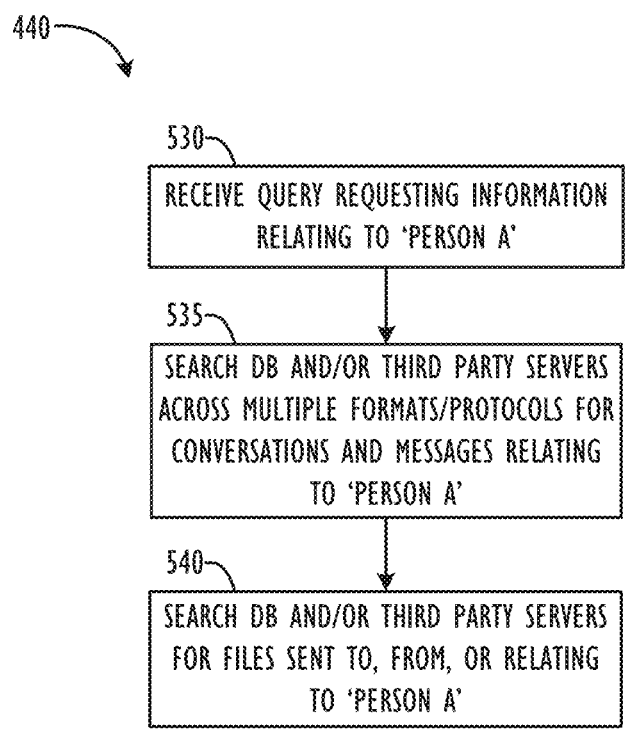
FIG. 5C is a flowchart of one embodiment of a method for performing a "person-centric" content search across multiple data formats and/or protocols, according to one or more disclosed embodiments.

FIG. 5C is a flowchart of one embodiment of a method for performing a "person-centric" content search across multiple data formats and/or protocols, according to one or more disclosed embodiments. The flowchart in FIG. 5C is labeled 440 to indicate that it represents a more detailed build out of Step 440 in the flowchart of FIG. 4. First, the system may receive a query requesting information relating to another particular person, 'Person A' (Step 530). Next, the system may search its database(s) and/or the relevant third party host servers across multiple data protocols and formats for conversations, messages, etc. relating to 'Person A' (Step 535). The search may return messages sent to or from 'Person A,' as well as messages that mention 'Person A,' or even messages that mention businesses, acquaintances, or interests, etc. that are associated with 'Person A.' Next, the system may search its database(s) and/or the relevant third party host servers across multiple data protocols and formats for documents relating to 'Person A' (Step 540). As with the conversation-focused search, the document-focused search may return documents sent to or from 'Person A,' as well as documents created by or for 'Person A', or documents that mention 'Person A,' or even documents that mention businesses, acquaintances, or interests, etc. that are associated with 'Person A.' The results of "person-centric" content search may then be packaged and returned to the client device as appropriate.

Figure 5D:
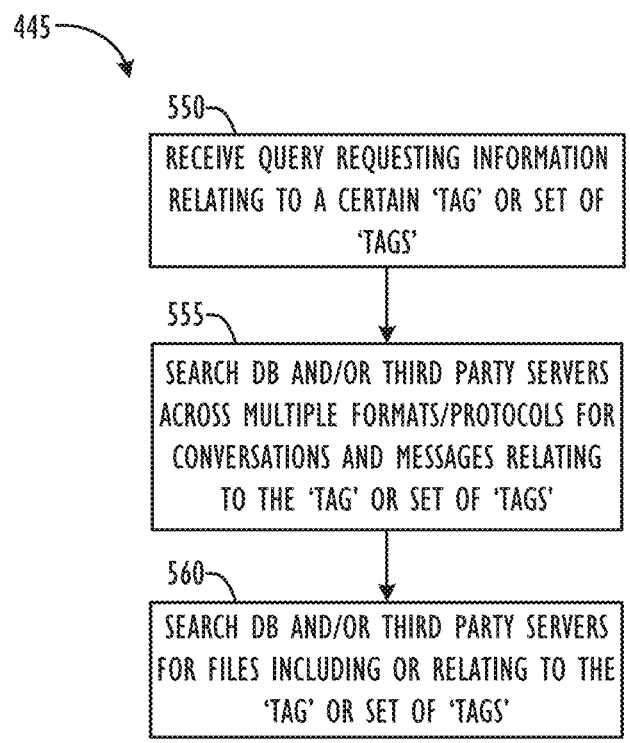
FIG. 5D is a flowchart of one embodiment of a method for performing a "tag-centric" content search across multiple data formats and/or protocols, according to one or more disclosed embodiments.

FIG. 5D is a flowchart of one embodiment of a method for performing a "tag-centric" content search across multiple data formats and/or protocols, according to one or more disclosed embodiments. The flowchart in FIG. 5D is labeled 445 to indicate that it represents a more detailed build out of Step 445 in the flowchart of FIG. 4. First, the system may receive a query requesting information relating to a particular tag or set of tags, e.g., tag clouds 510 or 520 discussed above with respect to FIG. 5B (Step 550). Next, the system may search its database(s) and/or the relevant third party host servers across multiple data protocols and formats for conversations, messages, etc. relating to the particular tag or set of tags (Step 555). Next, the system may search its database(s) and/or the relevant third party host servers across multiple data protocols and formats for documents relating to the particular tag or set of tags (Step 560). The results of "tag-centric" content search may then be packaged and returned to the client device as appropriate. As may now be understood, certain user queries may be only "person-centric," others may be only "tag-centric," while still other queries may combine elements of both "person-centric" and "tag-centric" searching.

Examples

Example 1 is a non-transitory computer readable medium that comprises computer executable instructions stored thereon to cause one or more processing units to: obtain a first plurality of messages for a first user, wherein the first plurality of messages comprises: one or more messages in each of a first plurality of formats; and one or more messages sent or received via each of a first plurality of protocols; and create one or more associations between one or more of the first plurality of messages, wherein at least one of the one or more associations is between messages sent or received via two or more different protocols from among the first plurality of protocols, and wherein at least one of the one or more associations is between messages in two or more different formats from among the first plurality of formats.

Example 2 includes the subject matter of example 1, wherein the instructions further comprise instructions to cause the one or more processing units to receive a query requesting at least one message from the first plurality of messages.

Example 3 includes the subject matter of example 2, wherein the instructions further comprise instructions to cause the one or more processing units to generate a result set to the query.

Example 4 includes the subject matter of example 3, wherein the result set comprises the at least one requested message and one or more messages from the first plurality of messages for which associations have been created to the requested message.

Example 5 includes the subject matter of example 1, wherein the instructions to create one or more associations between one or more of the first plurality of messages further comprise instructions to: perform a semantic analysis on the first plurality of messages; and create one or more clusters of messages from the first plurality of messages, wherein a cluster of messages comprises two or more messages that are associated together, and wherein the instructions to create the one or more clusters of messages further comprise instructions to create the one or more clusters of messages based, at least in part, on the semantic analysis performed on the first plurality of messages.

Example 6 includes the subject matter of example 5, wherein the instructions to perform a semantic analysis on a first plurality of messages further comprise instructions to identify one or more keywords in one or more of the first plurality of messages.

Example 7 includes the subject matter of example 5, wherein the instructions to perform a semantic analysis on a first plurality of messages further comprise instructions to perform a predictive semantic analysis on one or more of the first plurality of messages.

Example 8 includes the subject matter of example 1, wherein the instructions to create one or more associations between one or more of the first plurality of messages further comprise instructions to: perform element matching on the first plurality of messages.

Example 9 includes the subject matter of example 8, wherein the instructions to perform element matching on the first plurality of messages further comprise instructions to: perform element matching on at least one of the following: sender, recipient list, subject, quoted text, and timestamp.

Example 10 includes the subject matter of example 1, wherein the instructions to create one or more associations between one or more of the first plurality of messages further comprise instructions to: perform state matching on the first plurality of messages.

Example 11 is a system that comprises: a memory; and one or more processing units, communicatively coupled to the memory, wherein the memory stores instructions to configure the one or more processing units to: obtain a first plurality of messages for a first user, wherein the first plurality of messages comprises: one or more messages in each of a first plurality of formats; and one or more messages sent or received via each of a first plurality of protocols; and create one or more associations between one or more of the first plurality of messages, wherein at least one of the one or more associations is between messages sent or received via two or more different protocols from among the first plurality of protocols, and wherein at least one of the one or more associations is between messages in two or more different formats from among the first plurality of formats.

Example 12 includes the subject matter of example 11, wherein the instructions further comprise instructions to cause the one or more processing units to receive a query requesting at least one message from the first plurality of messages.

Example 13 includes the subject matter of example 12, wherein the instructions further comprise instructions to cause the one or more processing units to generate a result set to the query.

Example 14 includes the subject matter of example 13, wherein the result set comprises the at least one requested message and one or more messages from the first plurality of messages for which associations have been created to the requested message.

Example 15 includes the subject matter of example 11, wherein the instructions to create one or more associations between one or more of the first plurality of messages further comprise instructions to: perform a semantic analysis on the first plurality of messages; and create one or more clusters of messages from the first plurality of messages, wherein a cluster of messages comprises two or more messages that are associated together, and wherein the instructions to create the one or more clusters of messages further comprise instructions to create the one or more clusters of messages based, at least in part, on the semantic analysis performed on the first plurality of messages.

Example 16 includes the subject matter of example 15, wherein the instructions to perform a semantic analysis on a first plurality of messages further comprise instructions to identify one or more keywords in one or more of the first plurality of messages.

Example 17 includes the subject matter of example 15, wherein the instructions to perform a semantic analysis on a first plurality of messages further comprise instructions to perform a predictive semantic analysis on one or more of the first plurality of messages.

Example 18 includes the subject matter of example 11, wherein the instructions to create one or more associations between one or more of the first plurality of messages further comprise instructions to: perform element matching on the first plurality of messages.

Example 19 includes the subject matter of example 18, wherein the instructions to perform element matching on the first plurality of messages further comprise instructions to: perform element matching on at least one of the following: sender, recipient list, subject, quoted text, and timestamp.

Example 20 includes the subject matter of example 11, wherein the instructions to create one or more associations between one or more of the first plurality of messages further comprise instructions to: perform state matching on the first plurality of messages.

Example 21 is computer-implemented method, comprising: obtaining a first plurality of messages for a first user, wherein the first plurality of messages comprises: one or more messages in each of a first plurality of formats; and one or more messages sent or received via each of a first plurality of protocols; and creating one or more associations between one or more of the first plurality of messages, wherein at least one of the one or more associations is between messages sent or received via two or more different protocols from among the first plurality of protocols, and wherein at least one of the one or more associations is between messages in two or more different formats from among the first plurality of formats.

Example 22 includes the subject matter of example 21, further comprising receiving a query requesting at least one message from the first plurality of messages.

Example 23 includes the subject matter of example 22, further comprising generating a result set to the query.

Example 24 includes the subject matter of example 23, wherein the result set comprises the at least one requested message and one or more messages from the first plurality of messages for which associations have been created to the requested message.

Example 25 includes the subject matter of example 21, wherein act of creating one or more associations between one or more of the first plurality of messages further comprises: performing a semantic analysis on the first plurality of messages; and creating one or more clusters of messages from the first plurality of messages, wherein a cluster of messages comprises two or more messages that are associated together, and wherein the act of creating the one or more clusters of messages further comprises creating the one or more clusters of messages based, at least in part, on the semantic analysis performed on the first plurality of messages.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A non-transitory computer readable medium comprising computer executable instructions stored thereon to cause one or more processing units to:
obtain a plurality of messages comprising a first message in a first format or a first protocol and one or more second messages in a second format or a second protocol, wherein the first message and the one or more second messages are unassociated; and
create one or more associations between the first message and at least one message from the one or more second messages, wherein creating the one or more associations comprises:
performing an element-matching analysis on the plurality of messages, wherein performing the element-matching analysis comprises generating a predictive tag cloud based on at least one of a subject, a sender, a recipient, a quoted text, or a time stamp in the first message; and
creating one or more clusters of messages from the plurality of messages, wherein creating the one or more clusters of messages comprises:
associating the first message with the at least one message from the one or more second messages based, at least in part, on the at least one message from the one or more second messages containing at least one from the at least one of the subject, the sender, the recipient, the quoted text, or the time stamp.

2. The non-transitory computer readable medium of claim 1, wherein the instructions further comprise instructions to cause the one or more processing units to:
receive a query requesting a term in the first message; and
generate a result set in response to the received query.

3. The non-transitory computer readable medium of claim 2, wherein the result set comprises the one or more clusters of messages for which associations have been created for the first message and the at least one message from the one or more second messages in the second format or the second protocol.

4. The non-transitory computer readable medium of claim 2, wherein the received query comprises instructions to implement the query via a hybrid search approach, wherein the hybrid search approach includes a combination of a server-centric approach and a client-centric approach.

5. The non-transitory computer readable medium of claim 1, wherein the instructions to create the one or more associations between the first message and the at least one message from the one or more second messages further comprise instructions to:
perform a semantic analysis on the plurality of messages;
identify one or more keywords in one or more of the plurality of messages; and
create one or more additional clusters of messages from the plurality of messages, based, at least in part, on the semantic analysis performed on the plurality of messages.

6. The non-transitory computer readable medium of claim 5, wherein the instructions to perform the semantic analysis on the plurality of messages further comprise instructions to apply machine learning via a use of contextual cues or index mappings.

7. The non-transitory computer readable medium of claim 5, wherein the instructions to perform the semantic analysis on the plurality of messages further comprise instructions to apply machine learning based on historic patterns of communication that influence predictive threading, wherein the predictive threading comprises:
determining a likelihood of a conversation pervading across a plurality of formats and a plurality of protocols;
applying a machine learning technique at an individual user level based on the likelihood of the conversation pervading across the plurality of formats and the plurality of protocols; and providing one or more search results across the plurality of formats and the plurality of protocols.

8. The non-transitory computer readable medium of claim 1, wherein the instructions to create the one or more associations between the first message and the at least one message from the one or more second messages further comprise instructions to perform state-matching on the plurality of messages.

9. A system, comprising:
a memory; and
one or more processing units, communicatively coupled to the memory, wherein the memory stores instructions that when executed cause the one or more processing units to:
obtain a plurality of messages comprising a first message and one or more unassociated messages; and
create one or more associations between the first message and at least one unassociated message from the one or more unassociated messages, wherein creating the one or more associations comprises:
performing an element-matching analysis on the plurality of messages, wherein performing the element-matching analysis comprises generating a predictive tag cloud based on at least one of a subject, a sender, a recipient, a quoted text, or a time stamp in the first message; and
creating one or more clusters of messages from the plurality of messages, wherein creating the one or more clusters of messages comprises associating the first message with the at least one unassociated message from the one or more unassociated messages based, at least in part, on the at least one unassociated message containing at least one from the at least one of the subject, the sender, the recipient, the quoted text, or the time stamp.

10. The system of claim 9, wherein the instructions further comprise instructions that when executed cause the one or more processing units to:
receive a query requesting a term in the first message; and
generate a result set in response to the received query.

11. The system of claim 10, wherein the result set comprises the one or more clusters of messages for which associations have been created for the first message and the at least one unassociated message, wherein the first message is in a first format or a first protocol and the at least one unassociated message is in a second format or a second protocol, the second format being different from the first format and the second protocol being different from the first protocol.

12. The system of claim 10, wherein the received query comprises instructions to implement the query via a hybrid search approach, wherein the hybrid search approach includes a combination of a server-centric approach and a client-centric approach.

13. The system of claim 9, wherein the instructions to create one or more associations between the first message and the at least one unassociated message from the one or more unassociated messages further comprise instructions to:
perform a semantic analysis on the plurality of messages;
identify one or more keywords in one or more of the plurality of messages; and
create one or more additional clusters of messages from the plurality of messages, based, at least in part, on the semantic analysis performed on the plurality of messages.

14. The system of claim 13, wherein the instructions to perform the semantic analysis on the plurality of messages further comprise instructions to apply machine learning via a use of contextual cues or index mappings.

15. The system of claim 13, wherein the instructions to perform the semantic analysis on the plurality of messages further comprise instructions to apply machine learning based on historic patterns of communication that influence predictive threading, wherein the predictive threading comprises:
determining a likelihood of a conversation pervading across a plurality of formats and a plurality of protocols;
applying a machine learning technique at an individual user level based on the likelihood of the conversation pervading across the plurality of formats and the plurality of protocols; and
providing one or more search results across the plurality of formats and the plurality of protocols.

16. The system of claim 9, wherein the instructions to create the one or more associations between the first message and the at least one unassociated message from the one or more unassociated messages further comprise instructions to perform state-matching on the plurality of messages.

17. A computer-implemented method, comprising:
obtaining a plurality of messages comprising a message of a first type and one or more messages of a second type, wherein the first type is different from the second type; and
creating one or more associations between the message of the first type and at least one message from the one or more messages of the second type, wherein creating the one or more associations comprises:
performing an element-matching analysis on the plurality of messages, wherein performing the element-matching analysis comprises generating a predictive tag cloud based on at least one of a subject, a sender, a recipient, a quoted text, or a time stamp in the message of the first type; and
creating one or more clusters of messages from the plurality of messages, wherein creating the one or more clusters of messages comprises associating the message of the first type with the at least one message from the one or more messages of the second type based, at least in part, on the at least one message from the one or more messages of the second type containing at least one from the at least one of the subject, the sender, the recipient, the quoted text, or the time stamp.

18. The method of claim 17, further comprising:
receiving a query requesting a term in the message of the first type; and
generating a result set in response to the received query.

19. The method of claim 18, wherein the result set comprises the one or more clusters of messages for which associations have been created for the message of the first type and the at least one message from the one or more messages of the second type, wherein the first type and the second type comprise different formats and/or different protocols.

20. The method of claim 18, wherein the received query comprises instructions to implement the query via a hybrid search approach, wherein the hybrid search approach includes a combination of a server-centric approach and a client-centric approach.

21. The method of claim 17, further comprising:
performing a semantic analysis on the plurality of messages;
identifying one or more keywords in one or more of the plurality of messages; and
creating one or more additional clusters of messages from the plurality of messages, based, at least in part, on the semantic analysis performed on the plurality of messages.

22. The method of claim 21, wherein the performing the semantic analysis on the plurality of messages further comprises applying machine learning via a use of contextual cues or index mappings.

23. The method of claim 21, wherein the performing the semantic analysis on the plurality of messages further comprises applying machine learning based on historic patterns of communication that influence predictive threading, wherein the predictive threading comprises:
determining a likelihood of a conversation pervading across a plurality of formats and a plurality of protocols;
applying a machine learning technique at an individual user level based on the likelihood of the conversation pervading across the plurality of formats and the plurality of protocols; and
providing one or more search results across the plurality of formats and the plurality of protocols.

* * * * *